US009574677B2

(12) United States Patent
Fletcher et al.

(10) Patent No.: US 9,574,677 B2
(45) Date of Patent: Feb. 21, 2017

(54) SOLENOID-POWERED GATE VALVE

(71) Applicant: Dayco IP Holdings, LLC, Springfield, MO (US)

(72) Inventors: David E. Fletcher, Flint, MI (US); Brian M. Graichen, Leonard, MI (US); Matthew C. Gilmer, Whitmore Lake, MI (US); James H. Miller, Ortonville, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 56 days.

(21) Appl. No.: 14/567,450

(22) Filed: Dec. 11, 2014

(65) Prior Publication Data
US 2015/0090355 A1    Apr. 2, 2015

Related U.S. Application Data

(63) Continuation-in-part of application No. 14/473,151, filed on Aug. 29, 2014, and a continuation-in-part of application No. 14/277,815, filed on May 15, 2014.
(Continued)

(51) Int. Cl.
*F16K 3/16* (2006.01)
*F16K 3/18* (2006.01)
(Continued)

(52) U.S. Cl.
CPC .... *F16K 31/0668* (2013.01); *F02M 35/10229* (2013.01); *F02M 35/10255* (2013.01);
(Continued)

(58) Field of Classification Search
CPC .............. F16K 3/029; F16K 3/16; F16K 3/18; F16K 3/0227; F16K 3/314; F16K 31/0668; F16K 31/1221; F16K 51/02
(Continued)

(56) References Cited

U.S. PATENT DOCUMENTS 2,750,962 A   6/1956   Kreichman et al.
2,816,730 A   12/1957   Rabas
(Continued)

FOREIGN PATENT DOCUMENTS

CA   1063454   10/1975
CN   2085459   9/1991
(Continued)

OTHER PUBLICATIONS

US, Non-Final Office Action, U.S. Appl. No. 14/277,815, (Jan. 15, 2016).
(Continued)

*Primary Examiner* — Mary McManmon
*Assistant Examiner* — Richard K Durden
(74) *Attorney, Agent, or Firm* — Thompson Hine LLP

(57) ABSTRACT

A solenoid-powered gate valve that provides a reliable, high quality seal with a reduced operating force requirement. The valve includes a solenoid coil and armature connected to a valve mechanism, with the valve mechanism including a conduit having a connection opening, an oppositely-disposed pocket, and a sprung gate assembly linearly movable between the connection opening and the pocket. The sprung gate assembly includes a first gate member with an opening, a second gate member with an opening, and an endless elastic band retained between the first and second gate members, with the openings and endless elastic band collectively defining a passage through the sprung gate assembly, with the first and second gate members being mechanically coupled to the armature for reciprocating linear movement between the connection opening and the pocket. The endless elastic band allows an interference fit within the pocket with reduced frictional opposition to gate movement.

21 Claims, 16 Drawing Sheets

Related U.S. Application Data

(60) Provisional application No. 61/914,866, filed on Dec. 11, 2013, provisional application No. 61/872,402, filed on Aug. 30, 2013, provisional application No. 61/829,463, filed on May 31, 2013.

(51) Int. Cl.
    *F16K 31/06*      (2006.01)
    *F16K 3/02*      (2006.01)
    *F02M 35/10*      (2006.01)
    *F16K 3/314*      (2006.01)

(52) U.S. Cl.
    CPC ............... *F16K 3/029* (2013.01); *F16K 3/16* (2013.01); *F16K 3/18* (2013.01); *F16K 3/314* (2013.01); *Y10T 137/8696* (2015.04)

(58) Field of Classification Search
    USPC ........ 251/175, 193, 195, 196, 326, 327, 329
    See application file for complete search history.

(56) References Cited

U.S. PATENT DOCUMENTS

| | | |
|---|---|---|
| 2,913,220 A | 11/1959 | Cover |
| 2,953,346 A | 9/1960 | Liecke et al. |
| 3,069,131 A | 12/1962 | Grove |
| 3,113,757 A | 12/1963 | Nixon |
| 3,203,447 A | 8/1965 | Bremner et al. |
| 3,379,214 A | 4/1968 | Weinberg |
| 3,478,771 A | 11/1969 | Johnson |
| 3,534,307 A | 10/1970 | Spewock et al. |
| 3,635,601 A | 1/1972 | Larson et al. |
| 3,706,321 A | 12/1972 | Vicari |
| 3,768,774 A | 10/1973 | Baugh |
| 3,871,616 A | 3/1975 | Taylor |
| 4,010,928 A | 3/1977 | Smith |
| 4,013,090 A | 3/1977 | Taylor |
| 4,056,255 A | 11/1977 | Lace |
| 4,146,209 A | 3/1979 | Leva |
| 4,157,169 A | 6/1979 | Norman |
| 4,179,099 A * | 12/1979 | Pierce, Jr. ................ F16K 3/186 251/168 |
| 4,210,308 A | 7/1980 | Sims |
| 4,253,487 A | 3/1981 | Worley et al. |
| 4,321,652 A | 3/1982 | Baker et al. |
| 4,340,336 A | 7/1982 | Clary |
| 4,341,369 A | 7/1982 | Meyer |
| 4,385,280 A | 5/1983 | Reisem |
| 4,446,887 A | 5/1984 | Redmon et al. |
| 4,535,967 A | 8/1985 | Babbitt et al. |
| 4,568,058 A | 2/1986 | Shelton |
| 4,585,207 A | 4/1986 | Shelton |
| 4,638,193 A | 1/1987 | Jones |
| 4,779,582 A | 10/1988 | Lequesne |
| 4,934,652 A | 6/1990 | Golden |
| 5,000,215 A | 3/1991 | Phillips |
| 5,059,813 A | 10/1991 | Shiroymama |
| 5,172,658 A | 12/1992 | Hampton |
| 5,195,722 A | 3/1993 | Bedner |
| 5,234,088 A | 8/1993 | Hampton |
| 5,235,941 A | 8/1993 | Hampton |
| 5,377,955 A | 1/1995 | Baker |
| 5,394,131 A | 2/1995 | Lungu |
| 5,627,504 A | 5/1997 | Kleinhappl |
| 5,909,525 A | 6/1999 | Miller et al. |
| 6,057,750 A | 5/2000 | Sheng |
| 6,158,718 A | 12/2000 | Lang et al. |
| 6,199,587 B1 | 3/2001 | Shlomi et al. |
| 6,337,612 B1 | 1/2002 | Kim et al. |
| 6,425,410 B1 | 7/2002 | Taylor |
| 6,442,955 B1 | 9/2002 | Oakner et al. |
| 6,563,238 B1 | 5/2003 | Lee et al. |
| 7,017,886 B1 | 3/2006 | Ngene-Igwe |
| 7,108,008 B2 | 9/2006 | Moreno |
| 7,126,449 B2 | 10/2006 | Nickel et al. |
| 7,523,916 B2 | 4/2009 | Fenton |
| 7,849,674 B2 | 12/2010 | Masuda et al. |
| 8,235,011 B2 | 8/2012 | Lengfeld et al. |
| 8,561,392 B2 | 10/2013 | Ogunleye et al. |
| 2002/0066877 A1 | 6/2002 | Nakagawa |
| 2006/0016477 A1 | 1/2006 | Zaparackas |
| 2006/0219302 A1 | 10/2006 | Knop |
| 2008/0099710 A1 | 5/2008 | Jennings |
| 2009/0020719 A1 | 1/2009 | Ishigaki |
| 2009/0094009 A1 | 4/2009 | Muller |
| 2011/0132311 A1 | 6/2011 | Pursifull et al. |
| 2012/0256111 A1 | 10/2012 | Hoang et al. |
| 2012/0256113 A1 | 10/2012 | Comeaux |
| 2012/0286182 A1 | 11/2012 | Hoang et al. |
| 2012/0313023 A1 | 12/2012 | Brock |
| 2013/0061949 A1 | 3/2013 | Minezawa et al. |
| 2013/0062548 A1 | 3/2013 | Yokomi |
| 2013/0340732 A1 | 12/2013 | Pursifull et al. |
| 2014/0353534 A1 | 12/2014 | Graichen et al. |
| 2015/0060709 A1 | 3/2015 | Fletcher et al. |
| 2015/0090355 A1 | 4/2015 | Fletcher et al. |
| 2015/0159677 A1 | 6/2015 | Hampton et al. |
| 2015/0354600 A1 | 12/2015 | Fletcher et al. |
| 2016/0153472 A1 | 6/2016 | Fletcher et al. |

FOREIGN PATENT DOCUMENTS

| | | |
|---|---|---|
| CN | 1205065 | 1/1999 |
| CN | 2480633 | 3/2002 |
| CN | 2534389 | 2/2003 |
| CN | 101036012 | 9/2007 |
| CN | 101772624 | 7/2010 |
| CN | 201679974 | 12/2010 |
| CN | 101963240 | 2/2011 |
| CN | 201866285 | 6/2011 |
| CN | 102996837 | 3/2013 |
| DE | 2714933 | 10/1978 |
| DE | 3209199 | 9/1983 |
| DE | 19727602 | 10/1998 |
| EP | 1333207 | 6/2003 |
| GB | 1411303 | 10/1975 |
| JP | S59-214280 | 12/1984 |
| JP | S61-180423 | 8/1986 |
| JP | 3665674 | 6/2005 |
| WO | 95/29356 | 11/1995 |
| WO | 01/14775 | 3/2001 |
| WO | 2009/045140 | 4/2009 |
| WO | 2012/100287 | 8/2012 |
| WO | 2013/049643 | 4/2013 |

OTHER PUBLICATIONS

CN, Search Report; Patent Application No. 201480001143.2 (Jan. 22, 2016).
CN, Office Action; Patent Application No. 201480001143.2 (Feb. 3, 2016).
PCT, International Search Report and Written Opinion, International Application No. PCT/US2014/038018 (Nov. 26, 2014).
PCT, International Search Report and Written Opinion, International Application No. PCT/US2014/053435 (Dec. 18, 2014).
PCT, International Search Report and Written Opinion, International Application No. PCT/US2014/065252 (Feb. 19, 2015).
PCT, International Search Report and Written Opinion, International Application No. PCT/US2014/069461 (Mar. 4, 2015).
PCT, International Search Report and Written Opinion, International Application No. PCT/US2014/069528 (Mar. 10, 2015).
PCT, International Search Report and Written Opinion, International Application No. PCT/US2014/069796 (Mar. 12, 2015).
CN, Search Report; Patent Application No. 2014800021010 (Mar. 22, 2016).
CN, First Office Action; Patent Application No. 2014800021010 (Mar. 30, 2016).
CN, English Translation of First Office Action; Patent Application No. 2014800011432 (Feb. 3, 2016).
US, Notice of Allowance; U.S. Appl. No. 14/539,656; (Dec. 15, 2015).

(56) References Cited

OTHER PUBLICATIONS

CN, Search Report with English translation; Patent Application No. 201480002102.5; (Jul. 26, 2016).
CN, Office Action with English translation; Patent Application No. 201480002102.5; (Aug. 3, 2016).
US, Final Office Action; U.S. Appl. No. 14/277,815; (Aug. 5, 2016).
CN, Office Action and Search Report with English translation; Patent Application No. 201410391935.7; (Sep. 2, 2016).
CN, Office Action and Search Report with English translation; Patent Application No. 201480002180.5; (Sep. 2, 2016).
US, Non-Final Office Action; U.S. Appl. No. 14/565,814; (Jul. 21, 2016).
US, Non-Final Office Action; U.S. Appl. No. 14/473,151; (May 19, 2016).

\* cited by examiner

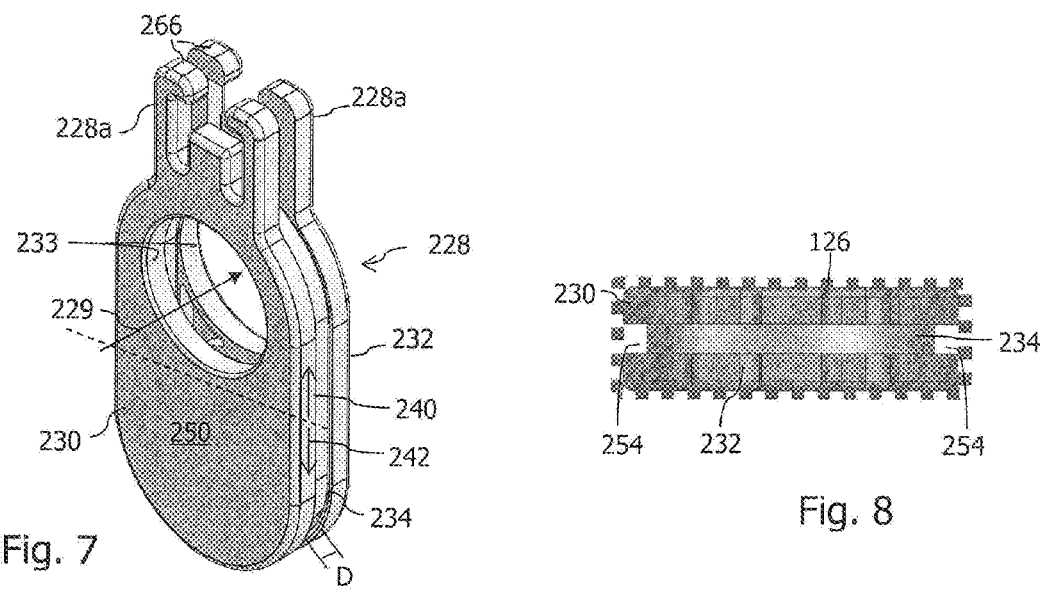
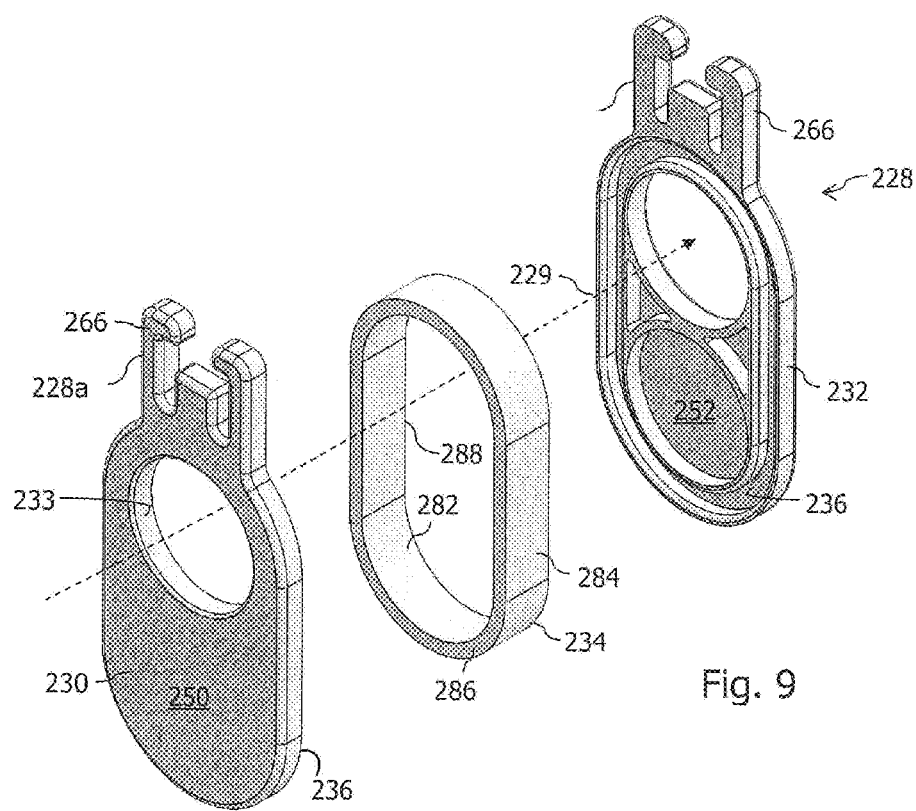

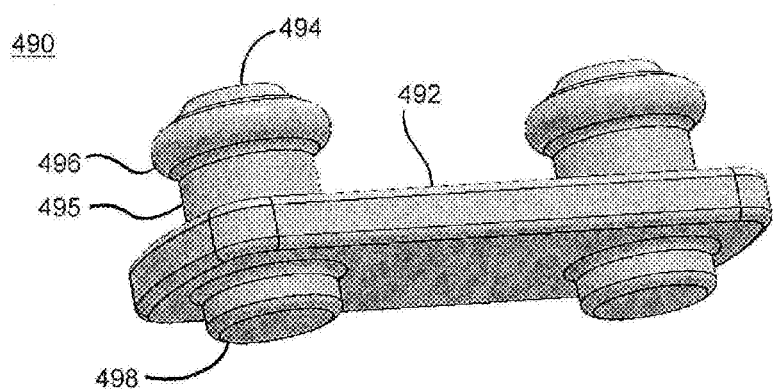
Fig. 21
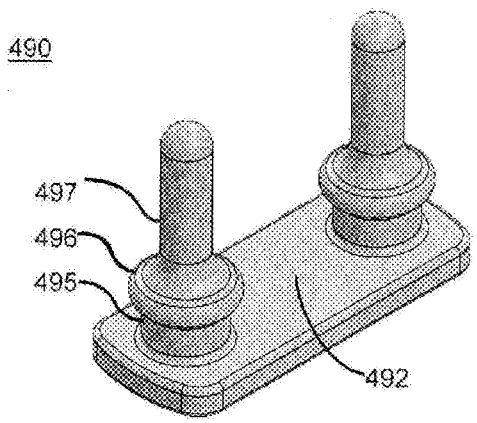 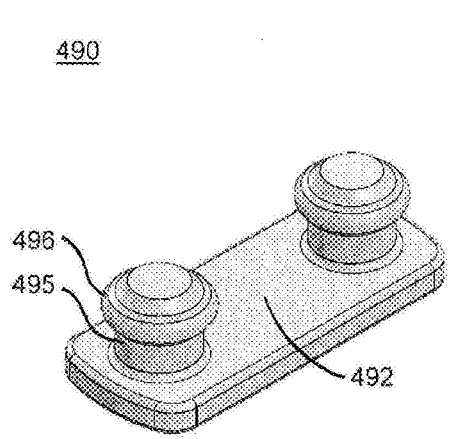
Fig. 22A                    Fig. 22B

SOLENOID-POWERED GATE VALVE

This application claims priority to U.S. Provisional Patent Application Nos. 61/829,463, filed May 31, 2013, 61/872,402, filed Aug. 30, 2013, and 61/914,866, filed Dec. 11, 2013, the entirety of which are incorporated by reference. This application further claims priority to U.S. patent application Ser. No. 14/277,815, filed May 15, 2014, and Ser. No. 14/473,151, filed Aug. 29, 2014, the entirety of which are incorporated by reference.

TECHNICAL FIELD

This application relates to gate valves and, more particularly, to a solenoid-powered gate valve adapted to selectively control the flow of air or other fluids with reduced solenoid operating force.

BACKGROUND

In automotive engines, vacuum developed within the intake manifold or produced by a vacuum generator (e.g., a vacuum pump or aspirator) is routinely used to power pneumatic accessories such as power brake boosters. On/off operation of the generator and/or accessory is frequently controlled by a gate valve in which a rigid gate is deployed across a conduit to stop the flow of a fluid (in this exemplary application, air) through the valve. Within automated or "commanded" valves, the gate is typically actuated by a solenoid actuator and opened or closed in response to an electrical current applied to the solenoid coil. These solenoid-powered gate valves also tend to include a coil spring, diaphragm, or other biasing element which biases the gate towards an unpowered, 'normally open' or 'normally closed' position. Since the biasing force must overcome frictional forces resisting movement of the gate in order to return the gate to its normal position, and since the solenoid mechanism must overcome both these same fictional forces and any biasing force in order to move the gate to its actively-powered position, frictional forces tend to dictate much of the required solenoid operating force.

A good seal typically requires some degree of interference between the gate and the walls of the conduit. Thus, increasing the design's interference to obtain a reliable, high quality seal (especially when accounting for component variation within reasonable tolerances) tends to increase both the frictional forces resisting movement of the gate and the required solenoid operating force. However, if seal reliability and quality could be maintained with lower frictional resistance, reductions in solenoid operating force would beneficially allow for a reduction in the size, weight, and power demand of the solenoid mechanism, and thus for a reduction in the size, weight, and heat-dissipating capacity of the gate valve as a whole.

SUMMARY

Disclosed herein is a solenoid-powered gate valve that provides a reliable, high quality seal with a reduced operating force requirement. The valve includes a solenoid coil and armature connected to a valve mechanism, with the valve mechanism including a conduit having a connection opening, an oppositely-disposed pocket, and a sprung gate assembly linearly movable between the connection opening and the pocket. The sprung gate assembly includes a first gate member, a second gate member opposing the first gate member, and an endless elastic band retained between the first and second gate members, with the first and second gate members being mechanically coupled to the armature for reciprocating linear movement between the connection opening and the pocket. In some embodiments, the mechanical coupling includes a stem that is slidable with respect to a connection opening end of the first and second gate members in at least a direction parallel to the longitudinal axis of the conduit. In some embodiments, one of the first and second gate members includes a check valve member selectively fluidly communicating with a chamber defined between the gate members within the perimeter of endless elastic band.

The endless elastic band permits the sprung gate assembly to produce an interference fit within the pocket without the large frictional forces that would be generated by compressing an integral gate constructed from a single, more rigid material, and also reduces the need for narrow component tolerances. The slidable mechanical coupling permits the sprung gate assembly to be linearly moved between the connection opening and the pocket by a solenoid mechanism and mechanical coupling which is not precisely aligned with the gate assembly, further reducing potential frictional resistance to movement of the gate assembly. The check valve allows high pressure events to pressurize the chamber when the sprung gate assembly is in the closed position so as to resist the tendency of such events to compress the sprung gate assembly and endless elastic band. The check valve also permits the endless elastic band to have a lower spring rate and/or simpler design than otherwise would be required. Those of skill will appreciate that the slidable mechanical coupling and check valve features are beneficial yet potentially optional parts of the invention.

BRIEF DESCRIPTION OF THE DRAWINGS

FIGS. 7-9 are a side perspective view, a bottom view, and a side perspective exploded view, respectively, of one embodiment of a sprung gate assembly.

FIG. 21 is a perspective view of an exemplary check valve member of the sprung gate assembly of FIG. 20.

FIGS. 22A and 22B are perspective views of the check valve member of FIG. 21 before (22A) and after (22B) assembly of the check valve member and a gate member.

DETAILED DESCRIPTION

Figure 1:
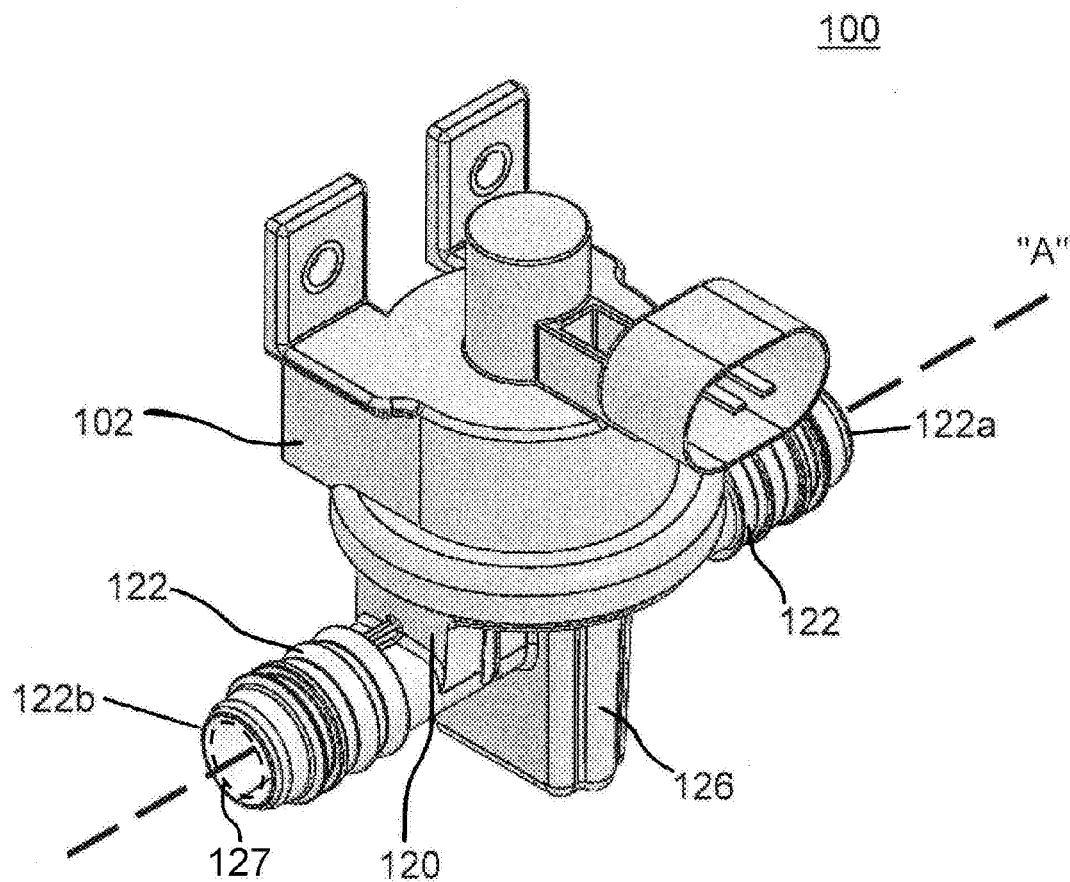
FIG. 1 is a perspective view of a valve including an actuator housing and valve mechanism.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 2:
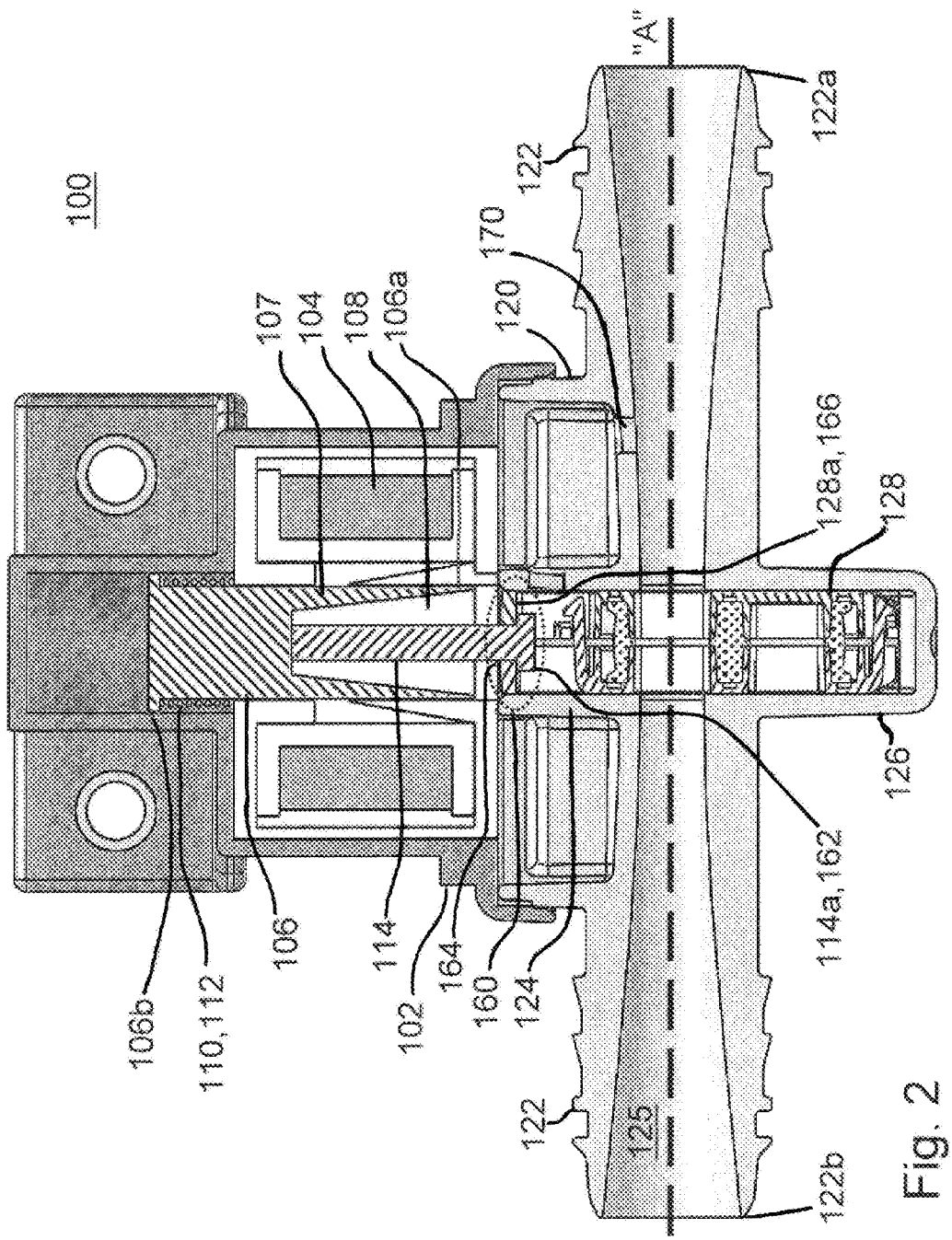
FIG. 2 is a cross-sectional view of the valve of FIG. 1 taken along the longitudinal axis and flow direction of the conduit of the valve mechanism, with a gate in an actively-powered, open position.
Figure 3:
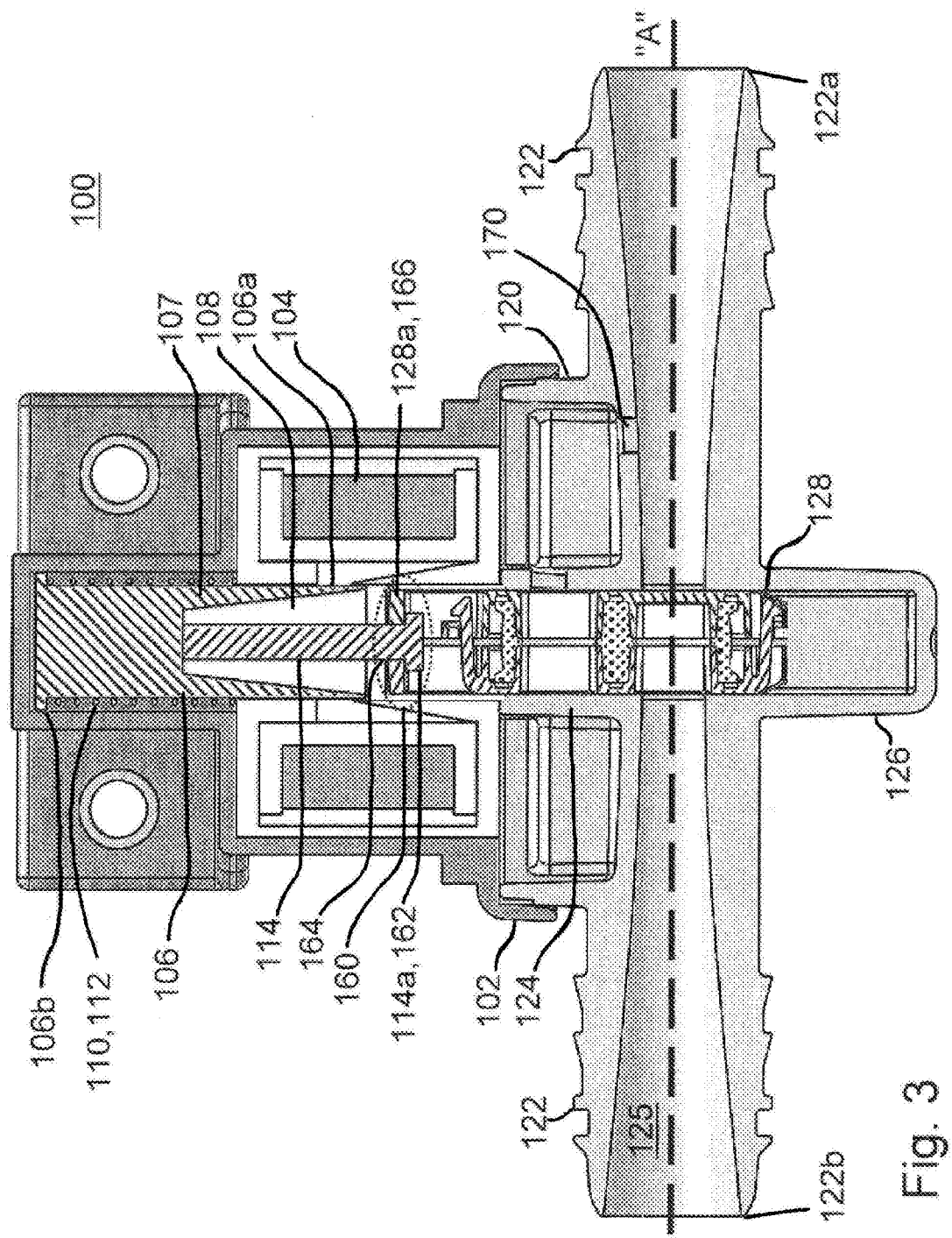
FIG. 3 is a cross-sectional view of the valve of FIGS. 1 and 2, taken along the longitudinal axis of the conduit of the valve mechanism, with the gate in an unpowered, closed position.

FIGS. 1-3 illustrate one embodiment of a gate valve 100 adapted to selectively control the flow of a fluid, for example, air flowing from an intake to a brake vacuum boost system. The gate valve 100 may have a housing 102 containing a solenoid coil 104 and an armature 106 connectable to a valve mechanism 120. The armature 106 includes an insertion end 106a received within the solenoid coil 104 and an adjoining body portion 107 that is more fully received within the solenoid coil upon the application of an electrical current to the coil. In one construction, the insertion end 106a and body portion 107 may be cylinders manufactured from a magnetic or paramagnetic material, for example an iron-containing alloy or a ferrite-containing composite material. In another construction, the insertion end 106a and body portion 107 may be cylinders having an internal recess 108 tapering from the insertion end 106a in the direction of the body portion 107 in order to provide for a gradual increase in pull-in force. The taper may be configured so that the pull-in force is greater than an oppositely-directed biasing force produced by a biasing element 110. As shown in FIG. 2, the biasing element 110 may be a coil spring 112 surrounding the body portion 107 of the armature 106 and abutting both the solenoid coil 104 and an non-insertion end 106b, but it will be appreciated that the biasing element could be a diaphragm or flat spring abutting or coupled to the non-insertion end, a leaf spring abutting or coupled to the non-insertion end, etc. Those of skill in the art will also appreciate that the solenoid may instead be a bistable solenoid including other biasing elements.

The valve mechanism 120 may include a conduit 122 having a connection opening 124, an oppositely-disposed pocket 126, and a sprung gate assembly 128 linearly movable between the connection opening and the pocket. The conduit 122 may be a tube that continuously, gradually tapers or narrows along a longitudinal axis "A" from both ends toward the connection opening 124, thereby having its smallest inner diameter at the connection opening 124 and oppositely-disposed pocket 126. The hour glass-shaped cross-section 125 of the conduit path reduces the frictional forces acting on the surfaces of the sprung gate assembly 128 during movement across the conduit 122. This cross-section 125 also minimizes the pressure drop across the gate valve 100. In other constructions, the conduit 122 may have a uniform inner diameter along its entire length. In the illustrated constructions the cross-section perpendicular to the longitudinal axis "A" is circular, but in variations the cross-section 127 may be elliptical (with uniform or tapering transverse and conjugate diameters), polygonal (with uniform or tapering characteristic widths), etc.

Figure 4:
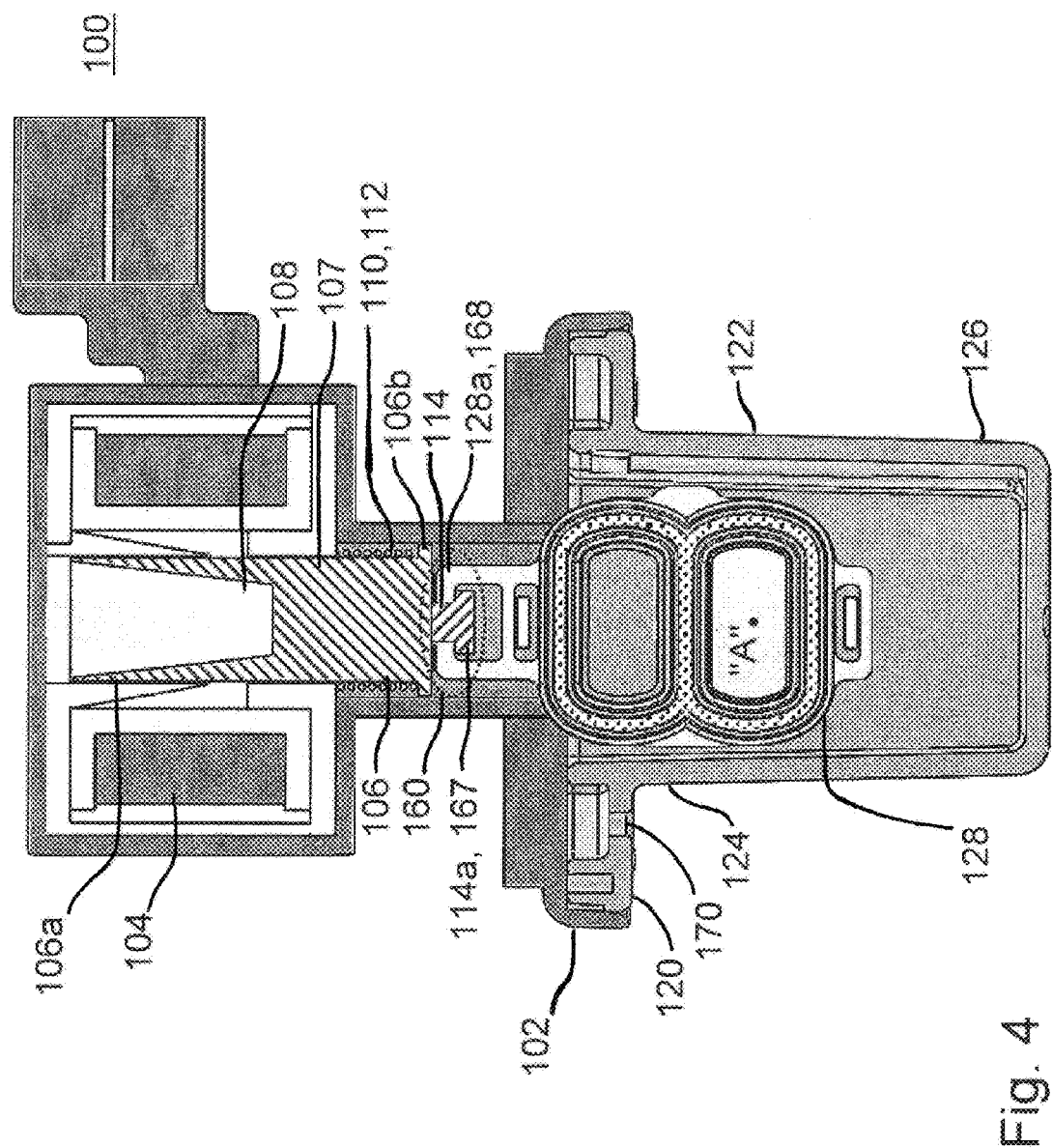
FIG. 4 is a cross-sectional view of a similar embodiment of a valve, taken along a plane perpendicular to the longitudinal axis and flow direction of the conduit of the valve mechanism, with a gate in an actively-powered, closed position.
Figure 5:
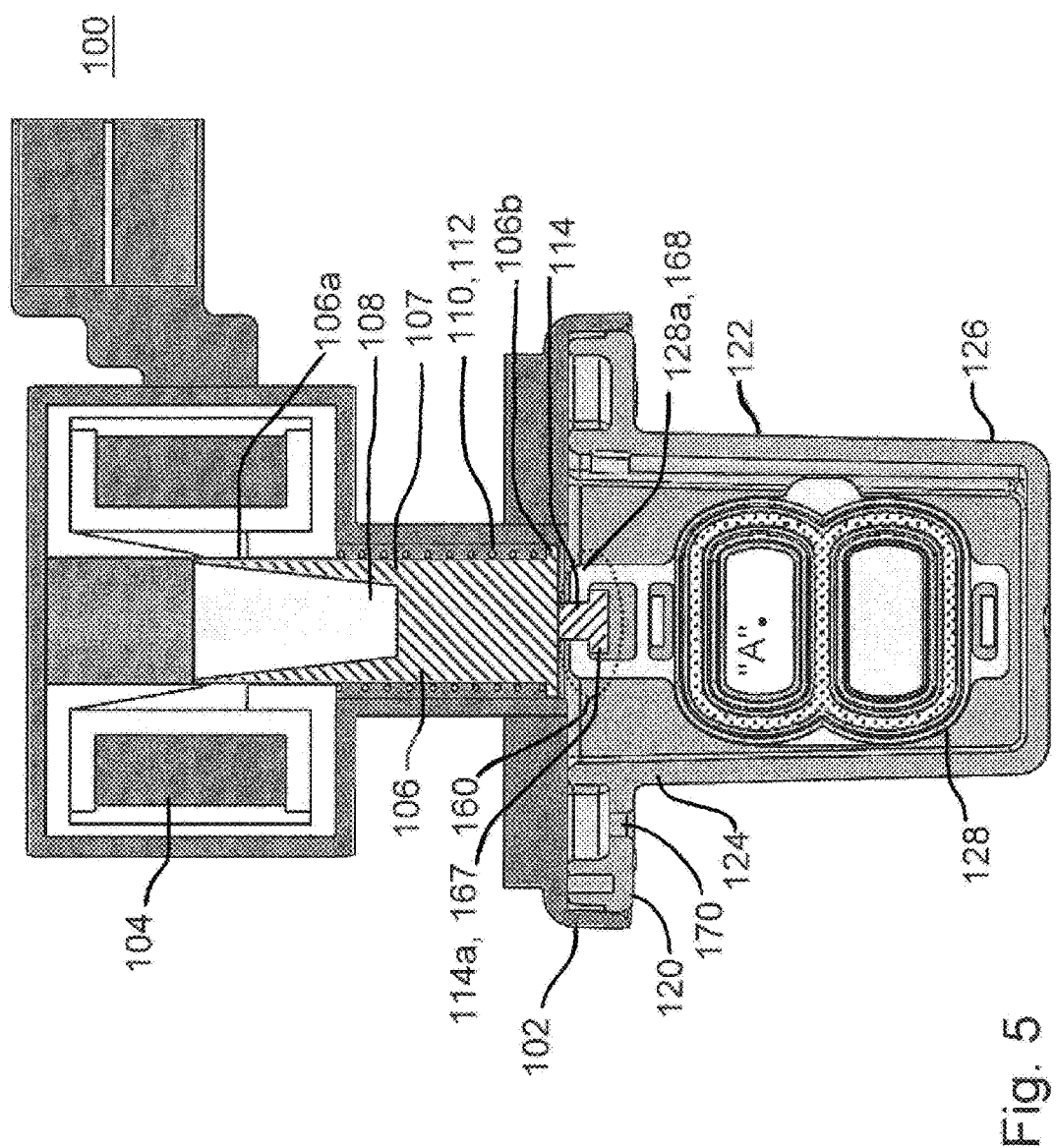
FIG. 5 is a cross-sectional view of the valve of FIG. 4, taken along a plane perpendicular to the longitudinal axis of the conduit of the valve mechanism, with the gate in an unpowered, open position.

In the embodiment of FIGS. 1-3, the sprung gate assembly 128 is mechanically coupled to the armature 106 by a stem 114 projecting from within the internal recess 108. In alternate embodiments, a stem 114 may project from the inserted end 106a of the armature 106 or from the non-inserted end of the armature 106, depending whether the solenoid coil 104 and armature 106 are configured to pull the stem toward or away from the valve mechanism 120 and connection opening 124. As shown in the embodiment of FIGS. 4-5, the relative arrangement of the solenoid coil 104, armature 106, biasing element 110, and stem 114 may be altered to change the gate valve 100 from a normally closed valve to a normally open valve or vice versa (depending upon the detailed construction of the sprung gate assembly 128, as discussed further below). In some constructions the stem 114 may be an integral projection from the armature 106, but in other constructions the stem may be an affixed projection manufactured from another, preferably non-magnetic, material.

A connection opening end of the stem, 114a, may be affixed to the sprung gate assembly 128, but the mechanical coupling is preferably slidable with respect to the sprung gate assembly in at least a direction parallel to the longitudinal axis of the conduit. In some constructions, the mechanical coupling includes a rail system 160 that permits relative sliding movement between the stem 114 and the sprung gate assembly 128 in a direction parallel to the longitudinal axis A. This slidable mechanical coupling allows the armature 106 to linearly move the sprung gate assembly 128 between the connection opening 124 and the pocket 126 without pulling the gate assembly towards either end of the conduit 122. Less than perfect alignment of the solenoid coil 104, armature 106, and/or stem 114 with the valve mechanism 120 would otherwise seek to cant the sprung gate assembly 128 from its path and thus tend to increase the frictional forces between the gate assembly and the walls of the conduit 122. In the embodiment shown in FIGS. 2-3, the rail system 160 includes a guide rail 162 positioned near the connection opening end of the stem 114a, with raceway grooves 164 disposed on opposing sides thereof. The connection opening end of the sprung gate assembly 128a correspondingly includes a slider 166 configured to wrap around the guide rail 162 and project within the raceway grooves 164. In a variant construction the rail system 160 may be reversed, with a slider 166 positioned near the connection opening end of the stem 114a and the members of the sprung gate assembly 128 each including a guide rail 162 and racetrack grooves 164. In the embodiment shown in FIGS. 4-5, the connection opening end of the stem 114a may include an enlarged, plate-like head 167. As better shown in FIGS. 12-14, the members of the sprung gate assembly 128 may alternately collectively define a multi-part socket 168 which snaps around the head 167 to permit sliding movement in multiple directions perpendicular to the path of linear movement of the sliding gate assembly 128.

Finally, the valve mechanism 120 may include a vent port 170 fluidly communicating with the connection opening 124 and, as further described below, the sprung gate assembly 128 and pocket 126, to vent fluids which leak past the sprung gate assembly and into the pocket. In highly dynamic flow environments, for example, an automotive engine in which turbocharging is used to boost air pressure within an intake manifold, differential pressures across the gate valve 100 may vary widely and even transiently reverse. High pressure air leaking into the pocket 126 may pressurize the pocket and alter the balance of solenoid operating force, biasing force, and expected fictional forces within the gate valve 100. A large differential in the pressurization of the solenoid mechanism and the pocket 126 may prevent the sprung gate mechanism from linearly moving completely within the pocket, causing the valve to operate in a partially-open-and-closed state. Vent port 170 may open to the interior of the conduit 122 in order allow fluid to flow from the pocket 126 to an inlet end of the conduit 122*a* (as shown in FIGS. 2-3) if the fluid is to be contained within the system, or may open to the exterior of the valve mechanism 120 (as shown in FIGS. 4-5) if the fluid may be released to the environment.

Figure 6:
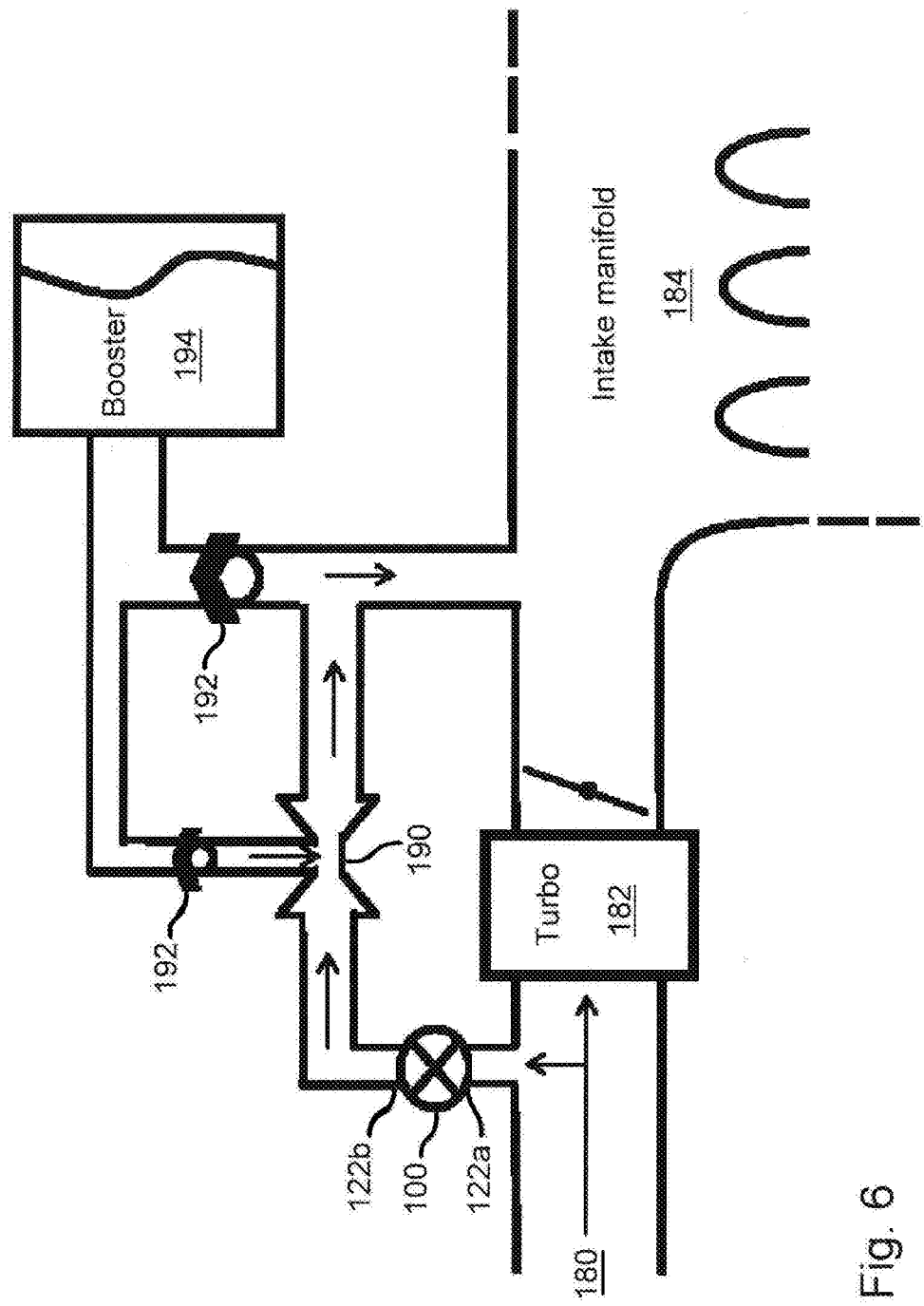
FIG. 6 is a schematic view of a non-specific embodiment in relation to an aspirator-based vacuum generator and power brake booster assembly.

Referring now to FIG. 6, the gate valve 100 may be used to control the flow of air through a vacuum boost power brake system. The conduit may be connected to an air intake 180 at an inlet end 122*a* and to a vacuum generator, in the illustrated example an aspirator 190, at an outlet end 122*b*. In an exemplary turbocharged engine configuration, a turbocharger and air intercooler 182 may pressurize the air being supplied to an intake manifold 184, causing the pressure within the intake manifold to exceed the air pressure at the inlet end 122*a*, and potentially causing a transient reverse flow through the aspirator 190. Check valves 192 prevent the power brake booster 194 from losing its vacuum charge, however reverse flow through the aspirator 190 can cause the fluid pressure at the outlet end 122*b* to exceed that at the inlet end 122*a*. This reversed pressure differential may be even greater than the ordinary pressure differential across the gate valve 100, since turbochargers customarily provide boost pressures of about 1 atmosphere (relative) and at such high boost pressures pressure at the inlet end 122*a* is likely to be substantially less than 1 atmosphere (absolute). Consequently, different embodiments of a sprung gate assembly 128, further described below, may be better suited for some applications. In addition, those of skill will appreciate that the gate valve 100 may be used in other applications, including non-automotive applications, and with fluids other than air.

Referring to FIGS. 7-9, another embodiment of a sprung gate assembly, generally designated as reference number 228, is illustrated. The sprung gate assembly 228 includes a first gate member 230, a second gate member 232, and an endless elastic band 234 received between the first and second gate members 230, 232. The endless elastic band 234 may be described as being sandwiched between the first and second gate members 230, 232. As seen in FIG. 9, the second gate member 232 includes a track 236, for receiving a portion of the endless elastic band, about a portion of its interior surface 252. While not visible in FIGS. 7-9, the first gate member 230 also includes a track 236.

The first and second gate members 230, 232 may be the same or substantially similar members, but are not intrinsically limited in that manner. As illustrated in FIGS. 7 and 9, where the first and second gate members 230, 232 are the same, each can be positioned facing either the inlet end 122*a* or the outlet end 122*b* of the conduit 122. This produces a valve with similar performance regardless of the direction of fluid flow in the conduit 122.

Referring to FIGS. 7 and 9 specifically, the first and second gate members 230, 232 both have openings 233 therein which collectively define a passage 229. In an open position, such as illustrated in FIG. 5, the passage 229 through the sprung gate assembly 228 is aligned with the conduit 122 to allow fluid to flow therethrough. The portion of the gate having passage 229 is referred to herein as the open position portion 240 (FIG. 7), and the adjacent portion, illustrated opposite a connection opening end 228*a* having a slider 266, is referred to as the closed position portion 242 because this portion of the gate 228, when moved to a closed position obstructs the conduit 122 to prevent fluid flow therethrough. The closed position portion 242 of each gate member 230, 232 in this embodiment has a substantially smooth continuous exterior surface 250. Those of skill will appreciate that the open position and closed position portions 240, 242 may be reversed, with the open position portion 240 opposite the connection opening end 228*a*, providing a second means of changing a gate valve design from normally closed to normally open (or vice versa).

In this illustrated embodiment, the endless elastic band 234 is generally oval shaped and thereby includes an inner perimeter 282 defining an open space, an outer perimeter 284, and opposing first and second sides 286, 288. The endless elastic band 234 is received in the tracks 236 of the first and second gate members 230, 232 with the first side 286 received in one track 236 and the second side 288 received in the other track 236. When the endless band 234 is seated in the tracks 236 of the first and second gate members 230, 232 the first and the second gate members 230, 232 are spaced apart from one another by a distance D (FIG. 7). The tracks 236 are positioned to recess the endless elastic band 234 a distance from the outer perimeter of the gate members as well. As seen in FIG. 8, this construction defines a channel 254 around the outer surface of the endless elastic band 234 between the first and second gate members 230, 232 for fluid flow around the sprung gate 228 within the pocket 126 and fluid communication with the vent port 170. This venting via channel 254 is generally perpendicular to the direction of fluid flow through the conduit 122 and vents fluid from the pocket 126 through the connector opening 124 (past and/or through the mechanical coupling) as the armature 106 moves the gate more fully into the pocket.

The endless elastic band 234 is compressible between the first and the second gate members 230, 232 and therefore functions as a spring acting parallel to the direction of flow through the conduit 122. Additionally, the endless elastic band 234 is expandable radially outward in response to forces applied to the endless elastic band 234 by fluid flowing through the conduit 122 to form a seal between the endless elastic band 234 and the outer wall portion of the tracks 236 in the first and second gate members 230, 232.

In operation, in the open position as illustrated in FIGS. 2 and 5, the fluid flowing through the conduit, whether flowing left to right or right to left, passes through passage 229 in the sprung gate assembly 228 and the pressure of the fluid provides a force acting on the endless elastic band 234 directed radially outward thereby pressing the endless elastic band into sealing engagement with the outer perimeter of the tracks 236. This sealing engagement reduces or prevents fluid leakage into the connector opening 124 and pocket 126, which renders the sprung gate assembly 228 more leak resistant than a single-material, uniformly rigid gate. This embodiment is well suited for use with naturally aspirated engines, in particular with air flowing at atmospheric or sub-atmospheric pressures through the conduit 122. However, in an embodiment where the conduit 122 is connected to the boost pressure side of a supercharged air intake system, the leak protection provided by the endless elastic band 234 aides in preventing the fluid flowing through the conduit 122 from generating pressures within the pocket 126 which could act to push the sprung gate assembly 228 (and armature 106, etc.) to another position or otherwise impede controlled movement of the assembly. The pressures in a supercharged engine, and experienced by the sprung gate assembly 228 and gate valve 100 generally, range between about 5 psi and about 30 psi.

The endless elastic band 234 also produces a gate that is less sensitive to manufacturing tolerances, in particular with respect to the dimensions of pocket 126 and the thickness of the gate members 230, 232, because of the presence of the endless elastic band. The pocket 126 is typically formed to have a width that is smaller than the unloaded width of a gate so as to produce an interference fit. In the sprung gate assembly 228, the endless elastic band 234 becomes compressed between the first and second gate members 230, 232 as the sprung gate 228 is inserted into the pocket 126. The endless elastic band's spring force on the first and second gate members 230, 232 when inserted (wedged) into the pocket 126 presses each respective gate member into a sealing engagement with a wall of the pocket to reduce or prevent leaks. Most importantly, the substantially lower modulus of elasticity of the endless elastic band versus that of the rigid gate members 230, 232, or that of a single rigid gate, means that the normal forces acting upon the sprung gate assembly 228 and resisting linear movement of the assembly along its path are substantially less. This reduces the frictional forces (frictional force is equal to normal force times the coefficient of frication) and thus the required solenoid operating force. This benefit is equally applicable to the other embodiments described below.

Figure 10:
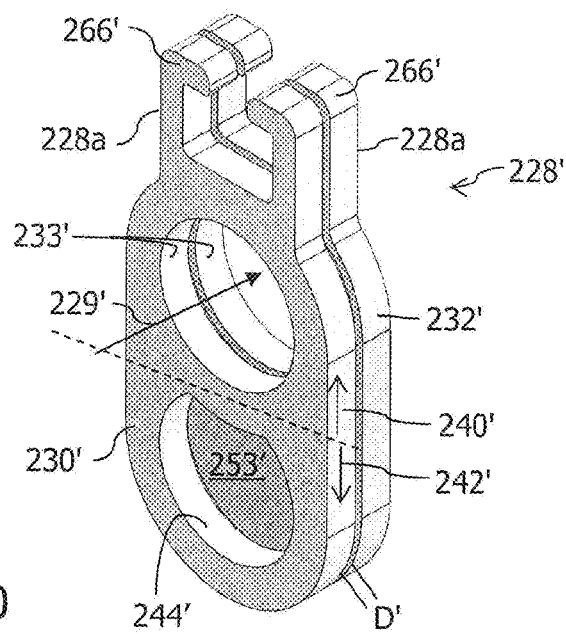
FIGS. 10-11 are a side perspective view and a side perspective exploded view, respectively, of another embodiment of a sprung gate assembly.
Figure 11:
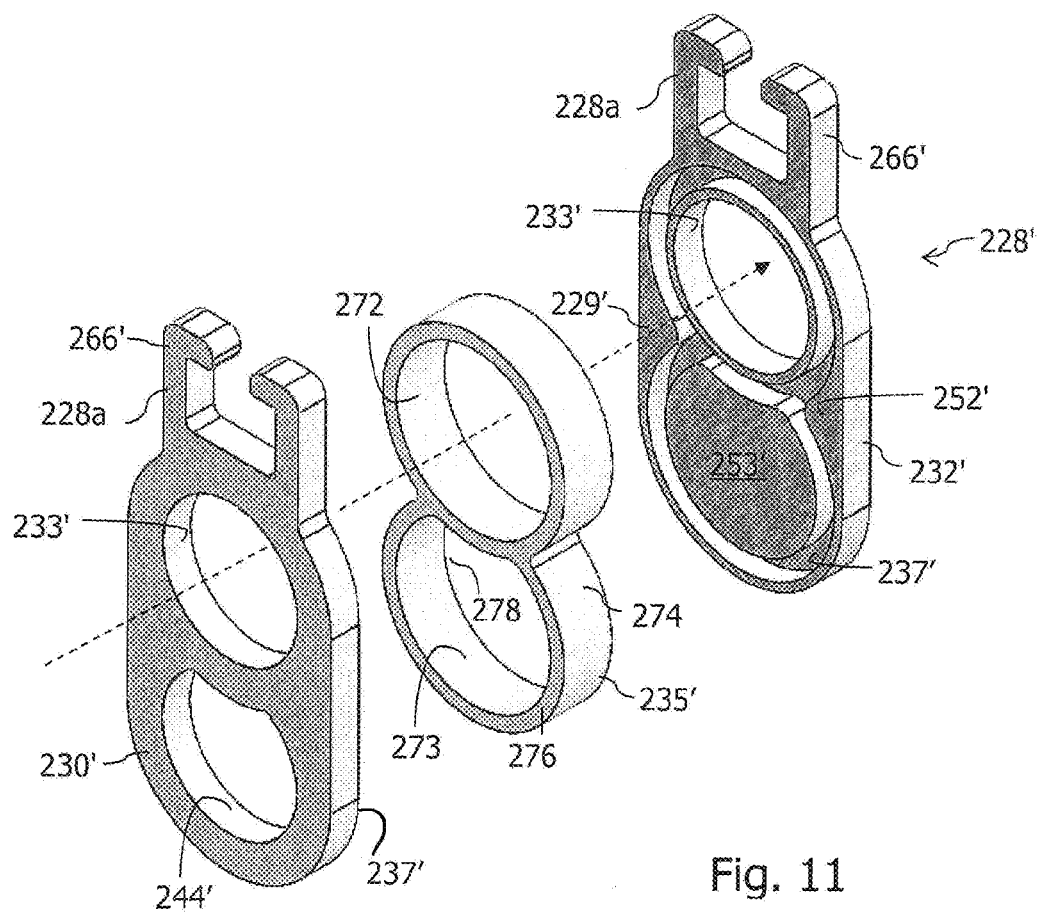

Referring now to FIGS. 10 and 11, another embodiment of a sprung gate assembly, generally designated as reference number 228', is provided which similarly includes a first gate member 230', a second gate member 232', and an endless elastic band 235' received between the first and second gate members 230', 232'. The endless elastic band 235' may be described as being sandwiched between the first and second gate members 230', 232'. As seen in FIG. 11, the second gate member 232' includes a track 237' about a portion of its interior surface 252' for receiving a portion of the endless elastic band 235'. While not visible in FIGS. 10 and 11, the first gate member 230' also includes a track 237'. Both gate members 230', 232' have a connection opening end 228a having a slider 266' for slidably coupling the gate assembly 228' to armature 106 as described above. However, as discussed above, in all such embodiments the members 230, 230', 232, 232', etc. may alternately include a guide rail and racetrack grooves similar to the guide rail 162 and racetrack grooves 164 of the stem 114.

Here, as illustrated in FIG. 11, the endless elastic band 235' is generally a figure-eight shaped band of elastic material and thereby includes a first inner perimeter 272 defining a first open space, a second inner perimeter 273 defining a second open space, an outer perimeter 274, and opposing first and second sides 276, 278. The endless elastic band 235' is received in the tracks 237' of the first and second gate members 230', 232' with the first side 276 received in one track 237' and the second side 278 received in the other track 237'. Since the endless elastic band 235' is figure-eight shaped, the track 237' is also typically figure-eight shaped.

When the endless elastic band 235' is seated in the tracks 237' of the first and second gate members 230', 232', the first and the second gate members 230', 232' are spaced apart from one another by a distance D' (FIG. 10). The tracks 237' are positioned to recess the endless elastic band 235' a distance from the outer perimeter of the first and second gate members 230', 232' to provide venting as described above with respect to FIGS. 7-9.

The first and second gate members 230', 232' are structurally different from one another, but both have first openings 233' therein which collectively define a passage 229' which, in an open position, is aligned with the conduit 122 to allow fluid to flow therethrough. This portion of the gate is referred to as the open position portion 240' (FIG. 10), and an adjacent portion thereto, opposite the slider 266', is referred to as the closed position portion 242' because this portion of the spring gate assembly 228', when moved to a closed position, obstructs the conduit 122 to prevent fluid flow therethrough. In this embodiment, the closed position portion 242' of the first gate member 230' includes a second opening 244' therethrough. The second opening may be dimensioned substantially the same as the first opening 233'. The second gate member 232' does not include a second opening in the closed position portion 242' thereof. Instead, the closed portion 242' of the second gate member 232' has a substantially continuous smooth exterior surface. The second gate member 232' may optionally include a plug 253' projecting from its interior surface 252', configured to fit within the dimensions of the second open space defined by the endless elastic band 235', and dimensioned to be at least the size of the second opening 244' in the first gate member 230', which defines a smaller opening than the second inner perimeter 273 of the endless elastic band 235'. The plug 253' may be a substantially smooth portion of the interior surface 252' of the second gate member 232'.

In the open position, fluid flowing through passage 229' provides a force acting on the endless elastic band 235' directed radially outward thereby pressing the endless elastic band into sealing engagement with the outer perimeter of the tracks 237'. This sealing engagement reduces or prevents fluid leakage into the into the connector opening 124 and pocket 126, which renders the gate 228' in the embodiment of FIGS. 10 and 11 more leak resistant than a single-material, uniformly rigid gate.

In the closed position, fluid flow in the conduit 122 is may be in the direction toward the side of the sprung gate 228' defined by the first gate member 230', i.e., the first gate member 230' may face an inlet end 122a of the gate valve 100. In particular, this orientation of flow is beneficial when the conduit 122 is connected the boost pressure side of a supercharged air intake system and generally is operated to stop boost pressure from flowing therethrough. This is so because the boost pressure passes through the second opening 244' and is directed by the plug 253' toward the second inner perimeter 273 of the endless elastic band 235' to act radially outwardly on the endless elastic band to sealingly engage it against the tracks 237' of the first and second gate members 230', 232'. The presence of the second opening 244' also minimizes the surface area of the exterior surface of the first gate member 230' upon which the boost pressure can apply a force acting parallel to the flow direction within the conduit 122 to axially compress the endless elastic band 235'. If the boost pressure does compress the endless elastic band 235' in the axial direction, one of the gate members 230', 232' would move closer to the other, decreasing D', and creating a gap between one wall of the pocket 126 and that gate member through which fluid could leak. This is an undesirable result. Accordingly, for gate member 228', it would be undesirable for the boost pressure to flow into the conduit in a direction that would impact the second gate member's 232' substantially continuous smooth exterior surface. In the example illustrated in FIG. 6, the opposite orientation of flow is beneficial since the highest pressure differential is likely to be a reversed pressure differential caused by boost pressure within the intake manifold crossing the aspirator to an outlet side of the gate valve.

Figure 12:
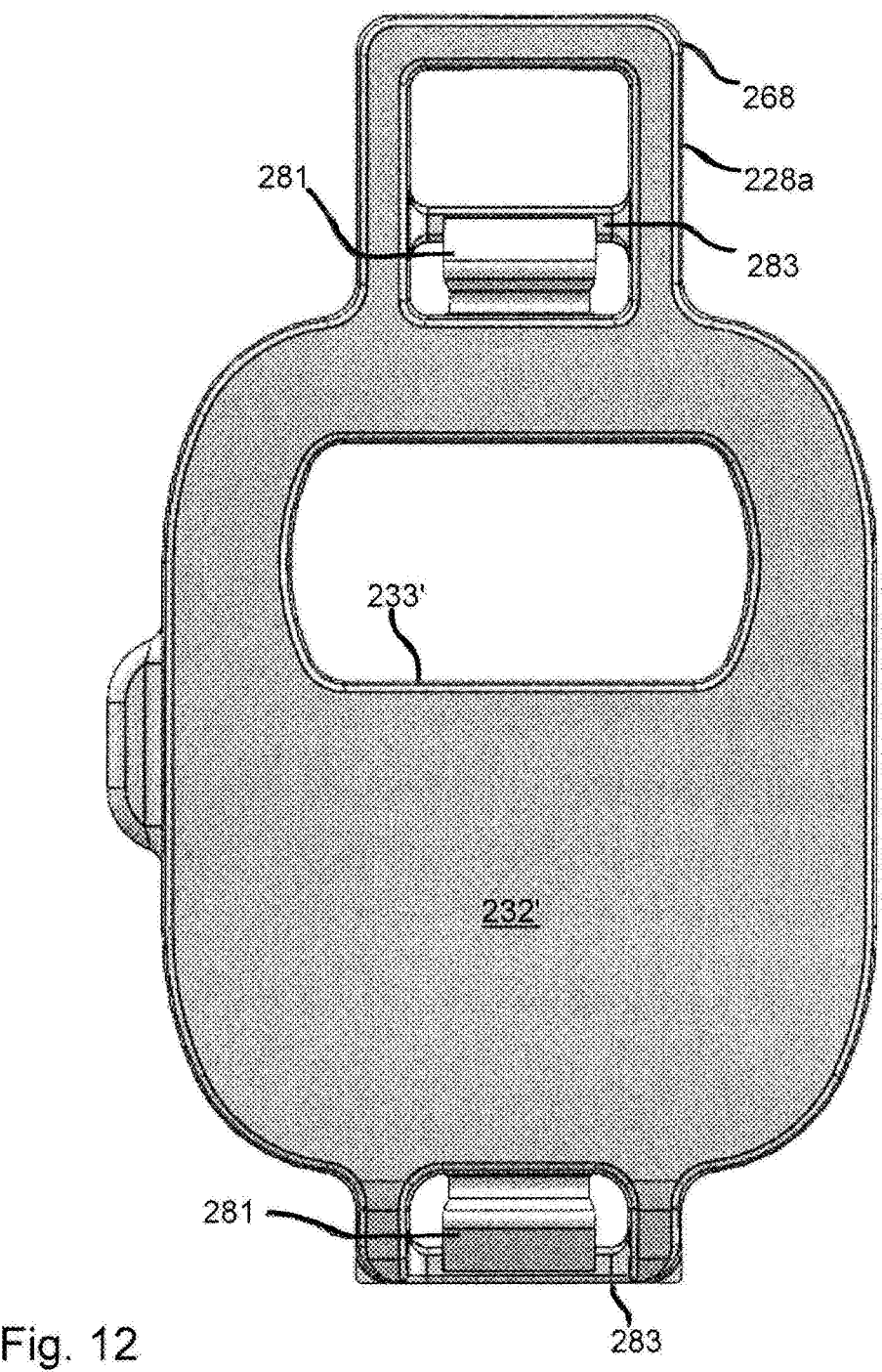
FIGS. 12-14 are a front view of a variant sprung gate member, a side cross-section of a variant sprung gate assembly, and a top perspective view of the variant sprung gate assembly. A pair of latches 281 are shown in FIG. 12 for context.
Figure 13:
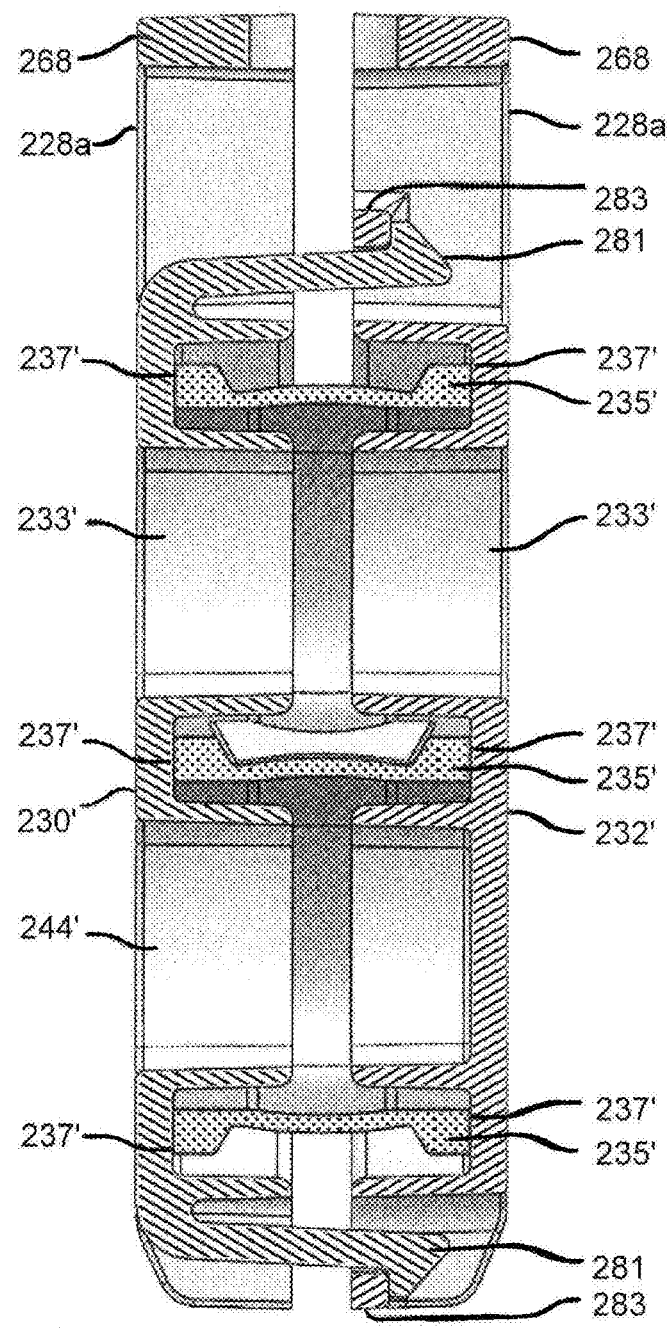
Figure 14:
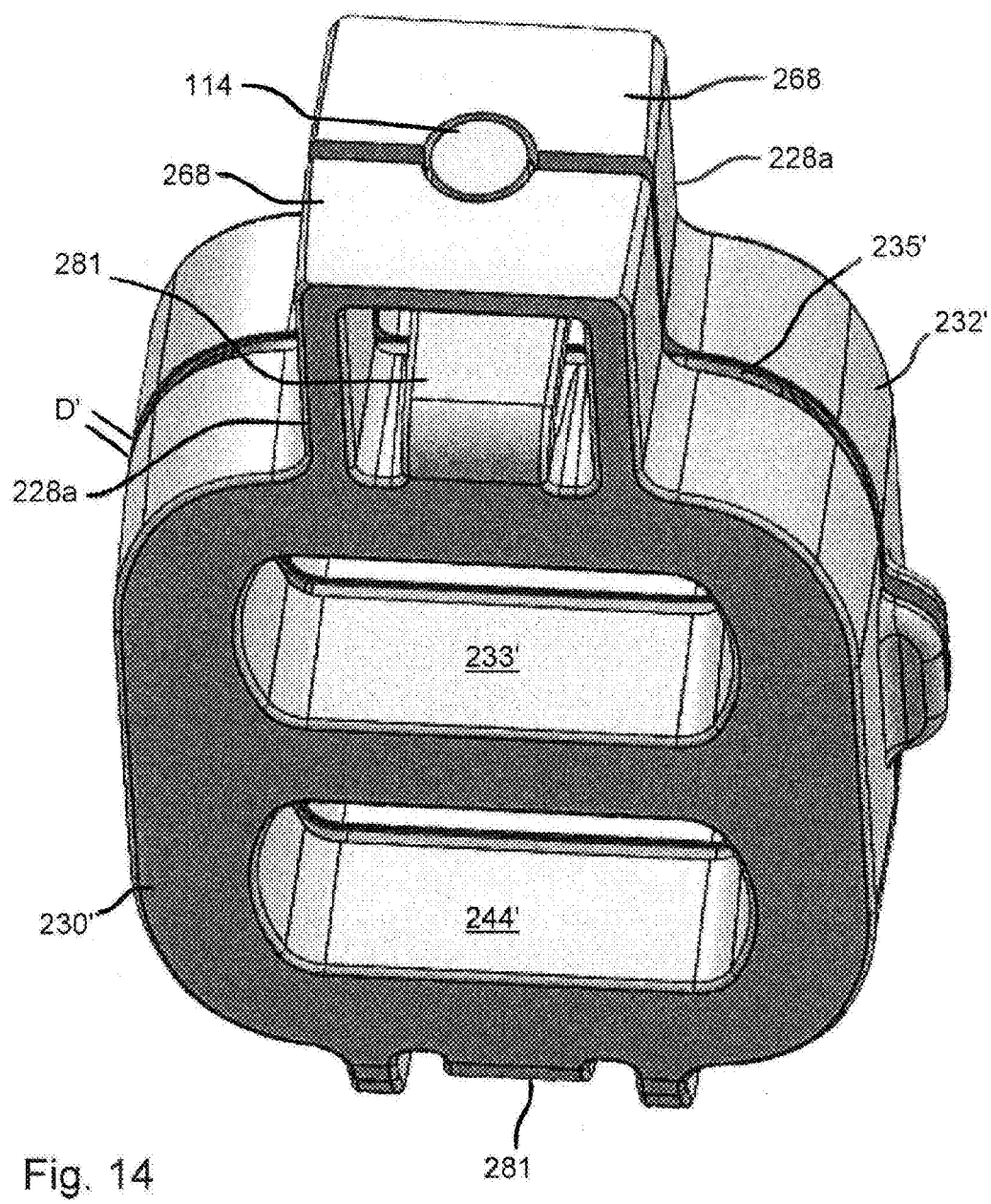

Referring now to FIGS. 12-14, in a variant of this or other embodiments one of the gate members 230', 232' may include a latch 281 and the other of the gate members 230', 232' may include a correspondingly disposed detent 283. As illustrated, the one may include a plurality of latches 281 and the other may include a plurality of detents 283, or each may include one latch 281 and one detent 283, with the latch 281 and detent 283 disposed on opposite ends of the members 230', 232' to correspond to the disposition of its counterpart element. The latches 281 and detents 283 assist in the assembly of the sprung gate assembly 228' (or 128, 228, etc.) by actively retaining the assembly in an assembled configuration prior to insertion within the pocket 126. Also, in a variant of this or other embodiments the gate members 230', 232' may collectively define a multi-part socket 268 which snaps around the head 167 (not visible in FIG. 14) of the stem 114 of the mechanical coupling. The socket 268 assists in the assembly of the sprung gate assembly 228' (or 128, 228, etc.) by actively retaining the assembly upon the stem 114 prior to insertion within the pocket 126.

Figure 15:
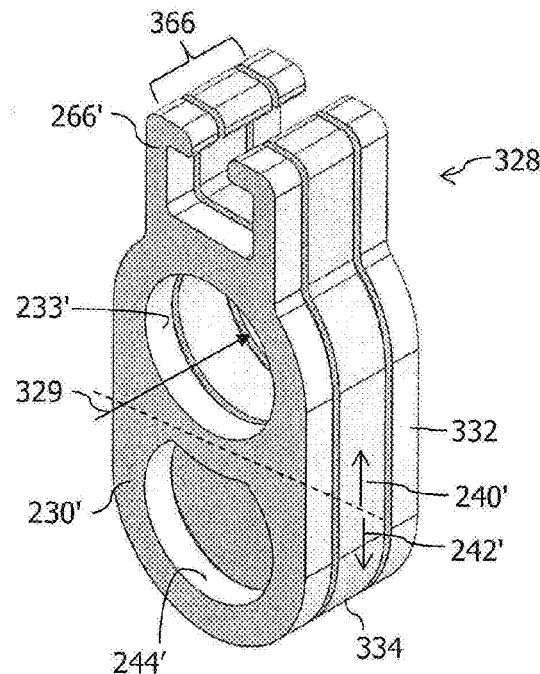
FIGS. 15-17 are a side perspective view, a front view, and a longitudinal cross-section of yet another embodiment of a sprung gate assembly.
Figure 16:
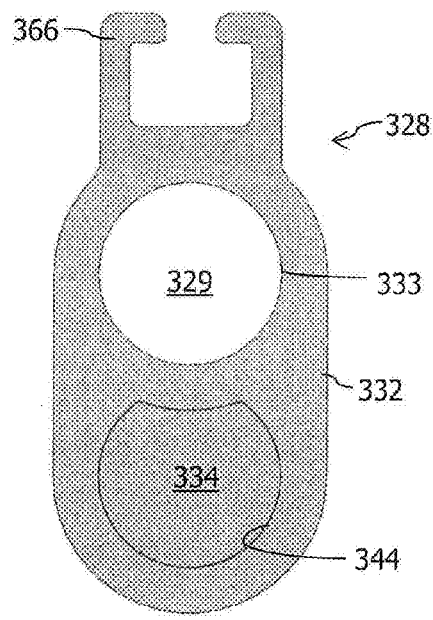
Figure 17:
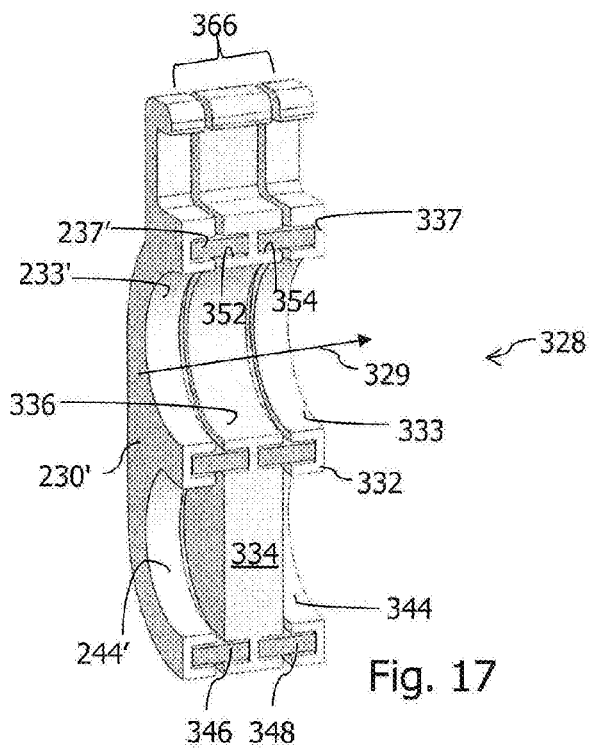

Referring now to FIGS. 15-17, a universal sprung gate assembly (operable with flow directed toward either of the first or the second gate members) is illustrated and designated by reference numeral 328. The universal sprung gate 328 has same first gate member 230' as the embodiment in FIGS. 10 and 11, a second gate member 332 that has the same general construction as the first gate member 230', an inner gate member 334 that provides the obstruction necessary for the closed position, a first endless elastic band 346 disposed within a track defined between the first gate member 230' and the inner gate member 334, and a second endless elastic band 348 disposed within a track defined between the second gate member 332 and the inner gate member 334. The second gate member 332, see FIG. 13, may include a slider 366, a first opening 333 in the open position portion 240', and a second opening 344 in the closed position portion 242' thereof. The inner gate member 334 includes an opening 336 in an open position portion 240' thereof and has opposing substantially continuous exterior surfaces defining the closed position portion 242', which can obstruct the flow of fluid through the conduit when the universal sprung gate 328 is in the closed position.

In the embodiment of FIGS. 15-17, a figure-eight shaped endless elastic band is preferred because of the two openings in each of the first and second gate members 230', 332. The figure-eight shaped endless elastic bands 346, 348 are as described above. Here, the first endless elastic band 346 is seated both in a first track 352 in the inner gate member 334 and in a track 237' in the first gate member 230', which are preferably in the shape of a figure-eight dimensioned to receive the first endless elastic band 346. Similarly, the second endless elastic band 348 is seated both in a second track 354 in the inner gate member 334 and in a track 337 in the second gate member 332, which are preferably in the shape of a figure-eight dimensioned to receive the second endless elastic band 348.

In operation, the universal sprung gate 328, in the open position and in the closed position, operates as described above with respect to the first gate member side of the sprung gate 228' of FIGS. 10 and 11. The universal sprung gate 328 may be used in normally aspirated, supercharged, or turbocharged engines without requiring any particular flow orientation. Its universal nature and the benefit of the reduced surface area in the closed position portion of each of the first and second gate members makes this gate function to seal the gate to reduce or prevent leakage into the connector opening 124 and pocket 126 regardless of the direction of flow through the conduit. This embodiment also has the benefit of providing multiple channels 254 around the exterior of the endless elastic band to provide fluid communication between the pocket and the vent port 170.

Figure 19:
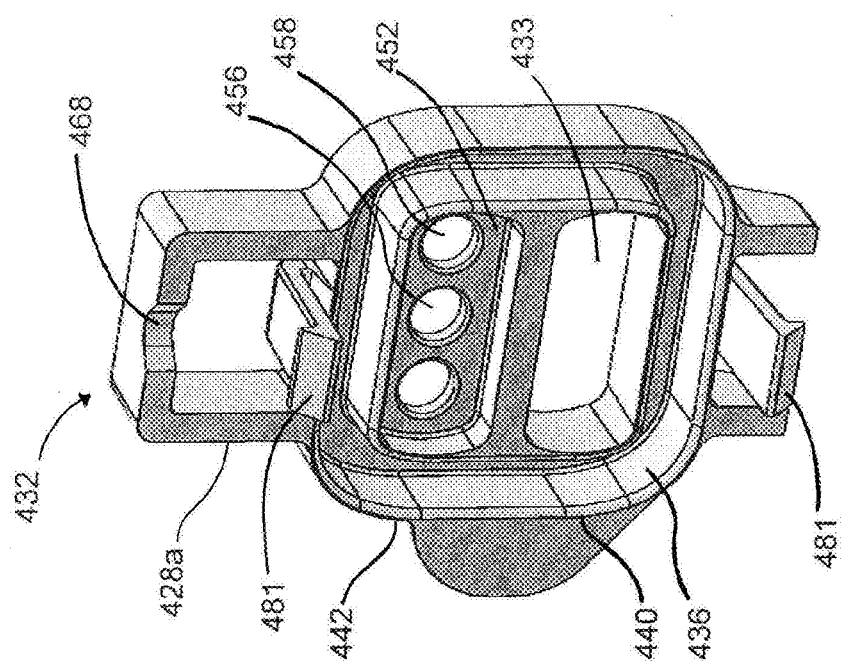
FIGS. 18-19 are perspective views of first and second gate members, respectively, of still another embodiment of a sprung gate assembly.
Figure 18:
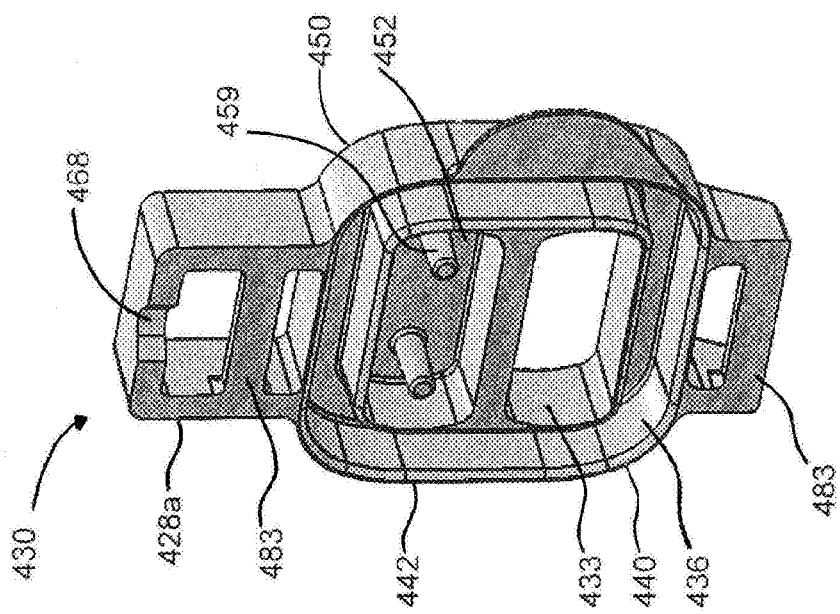

Referring to FIGS. 18-23, another embodiment of a sprung gate assembly, generally designated as reference number 428, is illustrated. The sprung gate assembly 428 includes a first gate member 430, a second gate member 432, and an endless elastic band 434 received or sandwiched between the first and second gate members 430, 432. As seen in FIGS. 18-19, the first and second gate members 430, 432 each include a track 436 for receiving a portion of the endless elastic band 434 about a portion of their respective interior surfaces 452. The first and second gate members 430, 432 also each have openings 433 through an open position portion 440 to collectively define a passage 429 so that, when the gate valve is opened, the passage will be aligned with a conduit to allow fluid to flow therethrough. The first and second gate members 430, 432 similarly each have a closed position portion 442, but in contrast to gate members 230 and 232 only the first gate member 430 may include a smooth continuous exterior surface 450 (suggested but not specifically shown) across its closed position portion 442. The second gate member 432 may instead have an exterior-facing recess 451 including a check valve opening 456, which is selectively sealed by a check valve member 490, and a plurality of check valve retainer openings 458, which receive and retain a plurality of check valve retainers 494. The check valve opening 456 and check valve retainer openings 458 are shown as a row of substantially identical circular openings, but it will be understood that different opening configurations, opening shapes, and numbers of check valve bead openings may be used so long as at least a pair of check valve retainer openings 458 bracket the check valve opening 456. The interior surface 452 of the closed position portion 442 of the first gate member 430 may optionally include a plurality of inwardly projecting stop posts 459 configured to align with the check valve retainer openings 458 upon assembly of the first and second gate members 430, 432. As will be further explained below, the inward ends of the stop posts 459 may function to prevent disengagement of the check valve retainers 494 from the check valve retainer openings 458 of the second gate member 432 during the initial moments of high pressure events.

As shown, the connection ends 428a of the first and second gate members 430, 432 may define a multi-part socket 468 which snaps around a head 167 of the armature stem 114 to permit sliding movement in multiple directions perpendicular to the path of linear movement of the sliding gate assembly 428. Alternately, as described in other embodiments, the connection ends 428a of the first and second gate members 430, 432 may be affixed to the armature stem 114, or may be slidable with respect to the armature stem 114 in a direction parallel to the longitudinal axis of the conduit. As in the rail system 160, each connection opening end 428a may include a guide rail with raceway grooves disposed on opposing sides thereof or a slider configured to wrap around the guide rail and project within the raceway grooves, depending upon the relative arrangement of the guide rails/raceway grooves and slider elements upon the connection opening end 114a of the stem 114 and the connection opening end 428a of the sprung gate assembly 428.

Figure 20:
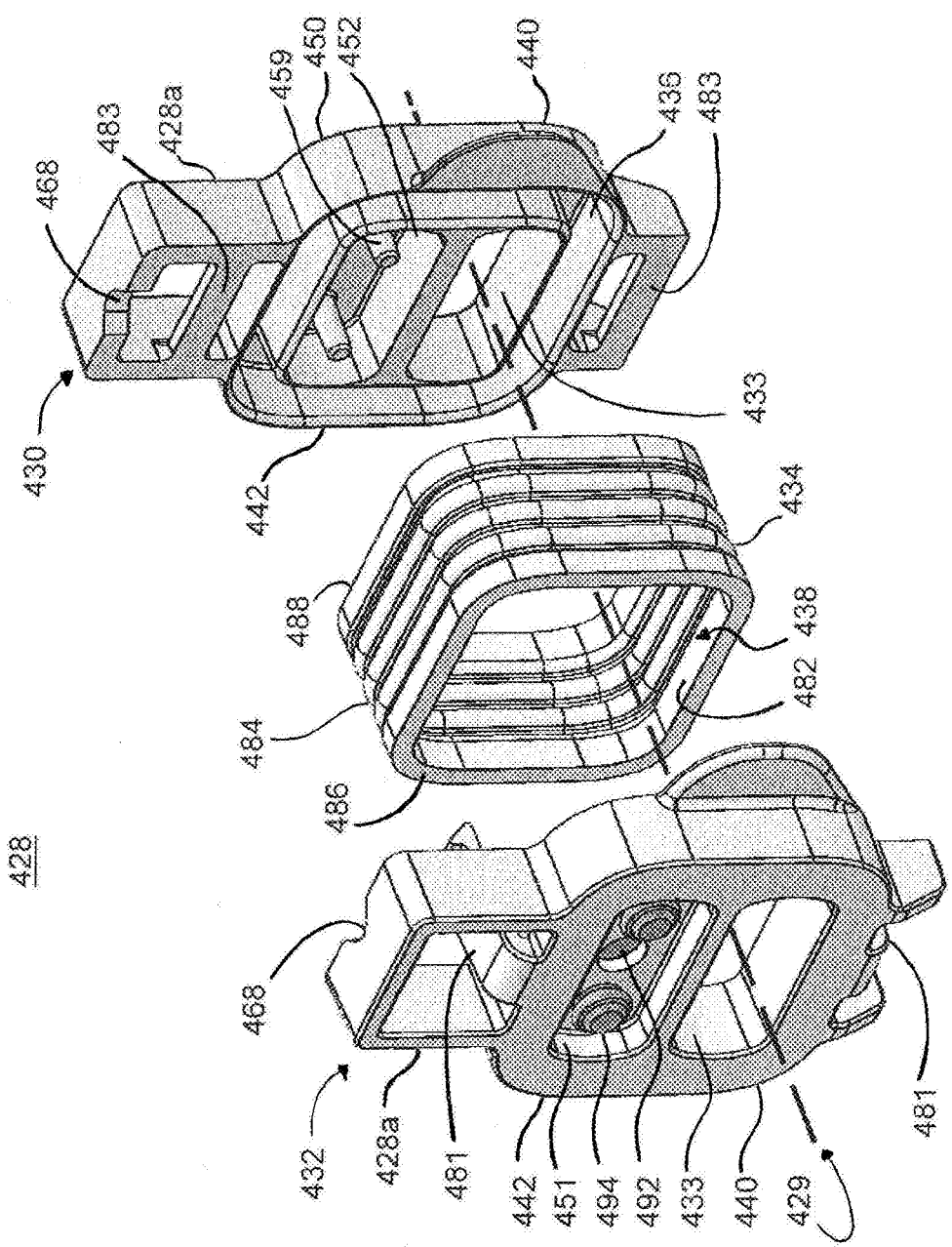
FIG. 20 is a partially exploded view of a sprung gate assembly including the members shown in FIGS. 18-19.
Figure 23:
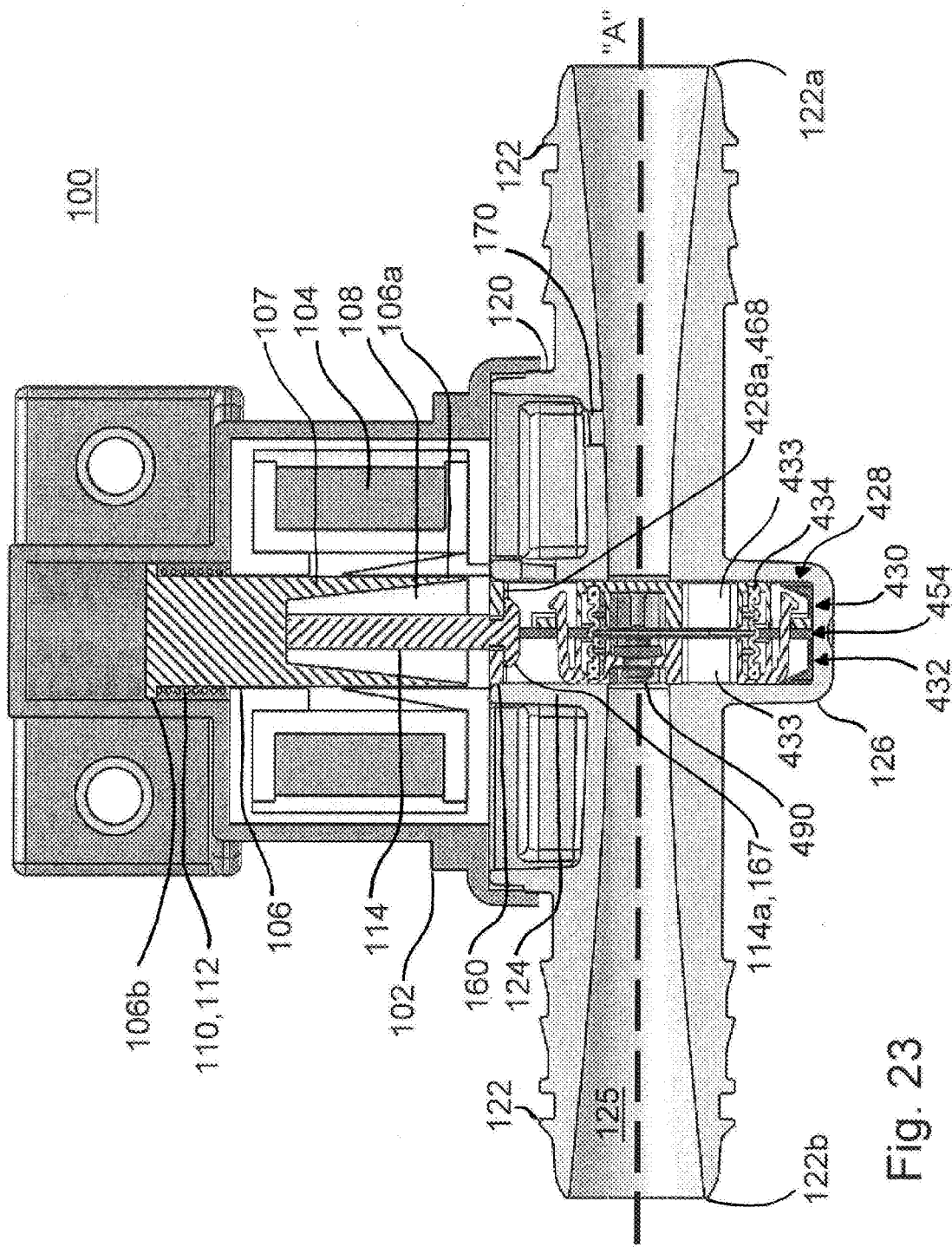
FIG. 23 is a cross-sectional view of an embodiment of a valve, taken along a plane perpendicular to the longitudinal axis and flow direction of the conduit of the valve mechanism, with the sprung gate valve of FIG. 20 in an actively-powered, closed position.

Turning to FIG. 20, the endless elastic band 434 includes an inner perimeter 482 defining an open space, an outer perimeter 484, and opposing first and second sides 486, 488. The endless elastic band 434 is received in the tracks 436 with the first side 486 received in one track 436 and the second side 488 received in the other track 436 so that the first gate member 430, second gate member 432, and endless elastic band 434 collectively define a chamber 438. To reduce the spring constant of the endless elastic band 434, the perimeter(s) of the band may have an accordion-walled longitudinal cross-section which allows the band to more easily compress between gate members 430 and 432 without switching to a lower modulus material. The first and second gate members 430 and 432 may optionally be secured to each other by latches 481 and correspondingly disposed detents 483, as described in other embodiments above, or may be secured to each other by fixing the first side 486 of band 434 in track 436 and fixing the second side 488 of band 434 in the other track 436. Fixation may be accomplished by adhering the sides 486, 488 within the respective tracks 436 or an interference fit between the sides 486, 488 and the respective tracks 436. As seen in FIG. 23, this construction defines a channel 454 around the outer surface of the endless elastic band 434 between the first and second gate members 430, 432 for fluid flow around the sprung gate 428 within the pocket 126 and to the vent port 170. As in previous constructions, venting via channel 454 vents fluid from the pocket 126 through the connector opening 124 (past and/or through the mechanical coupling) as the armature 106 moves the gate 428 more fully into the pocket. Also, this construction collectively defines a chamber 438 extending between the open position portion 440 and the closed position portion 442 of both gate members 430, 432.

The endless elastic band 434 is compressible between the first and the second gate members 430, 432 and therefore functions as a spring acting parallel to the direction of flow through the conduit 122. Additionally, the endless elastic band 434 is expandable radially outward in response to forces applied to the band by the passage of fluid into the chamber 438 through openings 433. Finally, when the gate valve is in the closed position, the endless elastic band 434 is expandable between the first and second gate member 430, 432 in response to pressurization of the chamber 438. Pressurization is controlled by check valve member 490, which allows selective fluid communication with chamber 438 to permit fluid flow from the conduit 122 into the chamber 438, but not from the chamber 438 into the conduit 122. As shown in FIG. 23, the second gate member 432 may be oriented towards the outlet end 122b of the conduit, so that in turbocharged engine configurations transiently reversed pressure differentials, caused by boost pressures within the intake manifold, may pressurize the chamber 438. As noted earlier, the reversed pressure differential may be even greater than the ordinary pressure differential, and thus may compress the endless elastic band 434 to a greater extent than ordinary, and may cause the second gate member 432 to move closer to the first 430, creating a gap with one wall of the pocket 126 through which fluid could leak. Pressurization of the chamber 438 will reduce the pressure differential between the chamber 438 and the outlet end 122b of the conduit 122 as well as the tendency of the pressure differential to compress the endless elastic band 434 in the axial direction. This prevents the second gate member 432 from being held away from the adjoining wall of the pocket 126, and thus reduces the need to design the spring rate of the endless elastic band 434 so as to resist overcompression by boost pressure differentials instead of compression by more ordinary atmospheric pressure differentials.

As shown in FIGS. 21, 22A, and 22B, check valve member 490 may comprise an elastomeric material having a generally planar sealing surface 492 and a plurality of projecting check valve retainers 494 bracketing the sealing surface. The check valve retainers 494 may each comprise a neck portion 495 adapted to extend through and plug a check valve retainer opening 458 and a head portion 496 adapted to be drawn through but otherwise interferingly retained by the walls of the check valve retainer opening 458. As shown in FIG. 21A, during assembly the head portion 496 may include a sacrificial tab extension 497 which is inserted through a check valve retainer opening 458 and then pulled to draw head portion 496 through the opening, whereupon the tab extension 497 may be removed to prevent interference with operation of the sprung gate assembly 428. The check valve member 490 may also comprise a plurality of oppositely projecting retainer stops 498 aligned with the projecting check valve retainers 494. The inward ends of the stop posts 459 of the first gate member 430 may, after assembly of the gate assembly 428, be disposed proximate the inward side of the check valve member 490 and, if included, the oppositely projecting retainer stops 498 in order to ensure that the check valve retainers 494 are not expelled from the check valve retainer openings 458 during sudden and large reverse pressure differentials within the conduit 122. Displacement of the generally planar sealing surface 492 from the check valve opening 456 of the second gate member 432 allows the chamber 438 to pressurize during such events, reversing any overcompression of the endless elastic band 434.

As shown in FIG. 23, sprung gate assembly 428 may be installed within valve mechanism 120 with second gate member 432 oriented toward outlet end 122b of conduit 122. When the sprung gate assembly 428 is in the open position, openings 433 through open position portions 440 and passage 429 are aligned with conduit 122 to allow fluid to flow therethrough. When the sprung gate assembly 428 is moved to the closed position, openings 433, open position portions 440, and passage 429 are moved out of alignment with conduit 122 (as illustrated into pocket 126 but, as described above, potentially into connection opening 124 if open position portions 440 and closed position portions 442 are reversed), and endless elastic band 434 biases the first and second gate members 430, 432 into sealing engagement with the walls of the connection opening 124 and pocket 126. The smooth continuous exterior surface 450 of the first gate member 430 accordingly blocks flow from inlet end 122a to outlet end 122b of the conduit 122. The check valve member 490 also provides an additional seal, preventing leakage around the first gate member 430 or through the connection opening 124 from being communicated to the outlet end 122b of the conduit 122. If a reversed pressure differential event occurs, the check valve member 490 of the second gate member 432 allows the chamber 438 to pressurize, and the smooth continuous exterior surface 450 of the first gate member 430 blocks flow from outlet end 122b to inlet end 122a of the conduit 122. In addition, pressurization of the chamber 438 reduces the reversed pressure differential between the outlet end 122b and the chamber 438 (i.e., the pressure differential across the second gate member 432), allowing the endless elastic band 434 to return or continue to press the second gate member 432 into sealing engagement with the adjoining wall of the pocket 126. When the sprung gate assembly 428 is returned to the open position, the chamber 438 may nonselectively fluidly communicate with conduit 122 through the openings 433, allowing the chamber to depressurize.

In contrast with the embodiment shown in FIGS. 7-9, the sprung gate assembly 428 does not require that the endless elastic band 234/434 have a spring constant capable of resisting a reversed pressure differential caused by boost pressure within the intake manifold (or other analogous events). This reduces the normal forces acting upon the sprung gate assembly 428 and thus the frictional forces resisting linear movement of the assembly along its path as well as the required solenoid operating force. In contrast with the embodiments shown in FIGS. 2-5 and 10-17, the sprung gate assembly 428 does not use a figure-eight shaped band 235' to provide an additional seal between open position portion 240'/440 (including openings 233'/433) and closed position portion 242'/442 (and second opening 244' or openings 244' and 344). This can reduce the complexity of the molds for the endless elastic band 434 and the first and second gate members 430, 432, but most advantageously can reduce the actuator travel required to move the sprung gate assembly 428 from an open position to a closed position, and vice versa. As can be seen by comparing FIGS. 2-5 and with FIGS. 18-19 and 23, the distance from the connection opening end 128a/428a of the respective sprung gate assembly 128, 428 to the opposite end of that assembly may be reduced by essentially eliminating the central segments of track 237' and band 235'(detailed in FIG. 11) separating the open and closed position portions of the assembly.

In one aspect, disclosed herein is a solenoid-powered gate valve. The solenoid actuates a sprung gate assembly comprising an endless elastic band retained between a first gate member and a second gate member which collectively define a passage through the gate assembly in an open position, where the passage through the gate is aligned with a conduit, and a closed position where a second portion of the gate obstructs the conduit to prevent fluid flow therethrough.

In one embodiment, the endless elastic band is generally an oval band of elastic material. In another embodiment, the endless elastic band is generally shaped as a figure-eight band of elastic material. In one embodiment, the elastic material is a natural or synthetic rubber. An elastic material enhances the seal of the sprung gate assembly without adding excessive frictional hysteresis to the actuator, which is undesirable because it is difficult to control with respect to at least time and temperature.

In one embodiment, at least one of the first and second gate members has a substantially smooth exterior surface, in particular on a closed position portion of the gate. In another embodiment, where only one of the first and second gate members has a substantially smooth exterior surface, the other gate member includes a second opening in the closed position portion of the gate. In another embodiment, both the first and second gate members include a second opening in their respective closed position portions; thus, to provide a closed portion the gate also includes an inner gate member having a substantially continuous exterior surface on both faces of the closed position portion thereof and a second endless elastic band as a seal between the inner gate member and the second gate member. In yet another embodiment, the second gate member includes a check valve opening and a check valve member sealing the check valve opening for selective fluid communication with a chamber defined between the gate members within the perimeter of endless elastic band.

It should be noted that the embodiments are not limited in their application or use to the details of construction and arrangement of parts and steps illustrated in the drawings and description. For instance, the described sprung gate assemblies may be used with pneumatic actuators, having stems actuated by diaphragms, pistons, or the like, powered by vacuum or air. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader, and are not for the purpose of limiting the invention.

What is claimed is:

1. A powered gate valve comprising:
   a solenoid coil and an armature connected to a valve mechanism;
   the valve mechanism including:
      a conduit having a connection opening and an oppositely-disposed pocket; and
      a sprung gate assembly linearly movable between the connection opening and the pocket;
   wherein the sprung gate assembly includes a first gate member having an opening, a second gate member having an opening and opposing the first gate member, and an endless elastic band retained between the first and second gate members, with the openings and endless elastic band collectively defining a passage through the sprung gate assembly; and
   wherein the first and second gate members are mechanically coupled to the armature for reciprocating linear movement between the connection opening and the pocket;
   wherein the second gate member has an exterior-facing recess, a check valve opening disposed within the exterior-facing recess, and a check valve disposed adjacent the check valve opening so as to selectively seal the check valve opening against flow out of a chamber defined by the first and second gate members and the endless elastic band.

2. The powered gate valve of claim 1, wherein the mechanical coupling comprises a stem projecting from the armature, and a connection-opening end of the stem is affixed to the sprung gate assembly.

3. The powered gate valve of claim 1, wherein the mechanical coupling comprises a stem projecting from the armature and a rail system interconnecting a connection-opening end of the stem with a connection-opening end of the sprung gate assembly so as to permit relative sliding movement between the stem and the spring gate assembly in a direction parallel to a longitudinal axis of the conduit.

4. The powered gate valve of claim 3, wherein one of the connection-opening end of the stem and the connection-opening end of the spring gate assembly includes a guide rail, and the other of the connection-opening end of the stem and the connection-opening end of the spring gate assembly includes a slider configured to wrap around the guide rail.

5. The powered gate valve of claim 1, wherein the mechanical coupling comprises a stem projecting from the armature, a connection-opening end of the stem includes an enlarged, plate-like head, and connection-opening ends of at least the first and second gate members collectively define a socket which surrounds the plate-like head.

6. The powered gate valve of claim 1, wherein the first and second gate members each include a track for receiving a portion of the endless elastic band, wherein the tracks and endless elastic band are configured such that the first and second gate members are spaced apart from one another by a non-zero distance when the endless band is seated in the tracks, and wherein the tracks are positioned to recess the endless elastic band a distance from the outer perimeters of the first and second gate members so as to form a channel around an outer surface of the endless elastic band disposed between the first and second gate members.

7. The powered gate valve of claim 6, further comprising a vent port fluidly communicating with the connection opening, the pocket, and the channel.

8. The powered gate valve of claim 1, wherein the pocket has a width, in a direction parallel to a longitudinal axis of the conduit, which is smaller than an unloaded width of the sprung gate assembly so as to produce an interference fit between the sprung gate assembly and the pocket upon insertion of the sprung gate assembly into the pocket.

9. The powered gate valve of claim 1, wherein the first and second gate members include a closed position portion with the first gate member having a second opening, the second gate member having a substantially continuous smooth exterior surface opposing the second opening, and the endless elastic band having a figure-eight shape separating the passage and the second opening within opposite loops of the figure-eight shape.

10. The powered gate valve of claim 9, wherein the second gate member has a plug projecting from an interior surface opposing the second opening, the plug being configured to fit within the adjoining loop of the figure-eight shape and dimensioned to be at least the size of the second opening.

11. The powered gate valve of claim 1, wherein one of the first and second gate members includes a latch and the other of the first and second gate members includes a correspondingly disposed detent, with the latch engaging the detent to retain the sprung gate assembly in an assembled configuration.

12. The powered gate valve of claim 1, wherein the endless elastic band has an accordion-walled longitudinal cross-section.

13. The powered gate valve of claim 1, wherein the exterior-facing recess includes a plurality of check valve retainer openings bracketing the check valve opening and the check valve includes a plurality of check valve retainers received and retained by the check valve retainer openings.

14. The powered gate valve of claim 1, wherein the first gate member has an interior surface opposing the plurality of check valve retainer openings and the interior surface includes a plurality of inwardly projecting stop posts aligned with check valve retainer openings and engaging the check valve.

15. The powered gate valve of claim 1, wherein the check valve includes a generally planar sealing surface and the check valve retainers comprise projecting neck portions adapted to extend through and plug the check valve retainer openings and head portions adapted to be interferingly retained by the walls of the check valve retainer openings.

16. The powered gate valve of claim 15, wherein the check valve includes a plurality of retainer stops aligned with the plurality of check valve retainers and oppositely projecting from the check valve.

17. The powered gate valve of claim 1, wherein the check valve selectively opens to fluidly interconnect the check valve opening with the chamber, first gate member opening, second gate member opening, and passage if a pressure at the exterior-facing recess is greater than a pressure within the chamber.

18. The powered gate valve of claim 17, wherein the check valve selectively closes to fluidly disconnect the check valve opening from the chamber, first gate member opening, second gate member opening, and passage if the pressure at the exterior-facing recess is less than a pressure within the chamber.

19. A sprung gate assembly comprising:
a first gate member and a second gate member each defining an opening therethrough in an open position portion thereof, the second gate member comprising a check valve opening in a closed position portion thereof having a check valve member selectively sealing the check valve opening; and
an endless elastic band, having an inner perimeter defining at least a first open space, sandwiched in compression between the first and second gate members with the first open space thereof oriented for alignment with the opening in both of the first and second gate members, which are aligned to form a passage through the sprung gate;
wherein the endless elastic band applies a bias force to the first and second gate members biasing them away from one another, and the first endless elastic band, the first gate member, and the second gate member collectively move together between an open position and a closed position.

20. The sprung gate assembly of claim 19, wherein the first gate member has a plurality of stop posts extending from an interior surface of a closed position portion toward the check valve member.

21. The sprung gate assembly of claim 19, wherein the check valve member includes a generally planar sealing surface, projecting neck portions each extending through a retaining opening in the second gate member, and a head portion on each projecting neck portion interferingly retained by the second gate member after passing through the retaining opening.

* * * * *